United States Patent
Han et al.

(10) Patent No.: US 12,503,451 B2
(45) Date of Patent: Dec. 23, 2025

(54) 2-ARYLTHIAZOLE DERIVATIVE OR SALT THEREOF, PREPARATION METHOD THEREFOR, AND PHARMACEUTICAL COMPOSITION COMPRISING SAME

(71) Applicant: HEXAPHARMATEC CO., LTD., Ansan-si (KR)

(72) Inventors: Shin Han, Ansan-si (KR); Jae-Hyoung Lee, Ansan-si (KR)

(73) Assignee: HEXAPHARMATEC CO., LTD., Ansan-si (KR)

( * ) Notice: Subject to any disclaimer, the term of this patent is extended or adjusted under 35 U.S.C. 154(b) by 579 days.

(21) Appl. No.: 17/996,544

(22) PCT Filed: Jan. 15, 2021

(86) PCT No.: PCT/KR2021/000578
§ 371 (c)(1),
(2) Date: Oct. 19, 2022

(87) PCT Pub. No.: WO2021/215624
PCT Pub. Date: Oct. 28, 2021

(65) Prior Publication Data
US 2023/0219908 A1 Jul. 13, 2023

(30) Foreign Application Priority Data

Apr. 21, 2020 (KR) .......................... 10-2020-0048262

(51) Int. Cl.
| | |
|---|---|
| *C07D 277/28* | (2006.01) |
| *A61P 1/16* | (2006.01) |
| *A61P 25/28* | (2006.01) |
| *C07D 417/06* | (2006.01) |
| *C07D 417/12* | (2006.01) |

(52) U.S. Cl.
CPC .............. *C07D 277/28* (2013.01); *A61P 1/16* (2018.01); *A61P 25/28* (2018.01); *C07D 417/06* (2013.01); *C07D 417/12* (2013.01)

(58) Field of Classification Search
CPC ................ C07D 277/28; C07D 277/56; C07D 417/06; C07D 417/12
See application file for complete search history.

(56) References Cited

U.S. PATENT DOCUMENTS

| | | |
|---|---|---|
| 7,728,009 B1 | 6/2010 | Pringle et al. |
| 7,790,720 B2 | 9/2010 | Celanire et al. |
| 7,863,450 B2 | 1/2011 | Celanire et al. |
| 10,391,067 B2 | 8/2019 | Kwon et al. |
| 10,662,169 B2 | 5/2020 | Kim et al. |
| 2008/0161331 A1 | 7/2008 | Leurs et al. |
| 2008/0275046 A1 | 11/2008 | Celanire et al. |
| 2010/0297035 A1 | 11/2010 | Pringle et al. |
| 2018/0243244 A1 | 8/2018 | Kwon et al. |
| 2018/0244644 A1 | 8/2018 | Kim et al. |
| 2019/0336483 A1 | 11/2019 | Lee et al. |
| 2020/0255397 A1 | 8/2020 | Kim et al. |
| 2021/0024474 A1 | 1/2021 | Wang et al. |

FOREIGN PATENT DOCUMENTS

KR 10-2012-0131401 A 12/2012

OTHER PUBLICATIONS

Fulton et al., Bioorganic & Medicinal Chemistry Letters (Jul. 2020), 30(13), 127212, pp. 1-5. (Year: 2020).*
Fulton, Mark G. Challenges In the Discovery and Optimization of MGLU2/4 Heterodimer Positive Allosteric Modulators and Total Synthesis of EPI and Pericoannosin A. Aug. 2019. Vanderbilt University, PhD dissertation. (Year: 2019).*
STN Chemical Abstract, entered Nov. 18, 2018, RN 2248935-86-4, "5-Thiazolecarboxamide, 2-[3-cyano-4-(2-methylpropoxy)phenyl]-4-methyl-N-[2-(4-morpholinyl)ethyl]", one page, copyright 2024 ACS on STN.
Kilaru et al., "Design, synthesis, in silico and in vitro studies of novel 4-methylthiazole-5-carboxylic acid derivatives as potent anticancer agents", Bioorganic & Medicinal Chemistry Letters, 2014, vol. 24, pp. 4580-4585.
Sekhar et al., "Augmenting the Xanthine Oxidase Inhibitory Activity of Febuxostat by its Structural Modification", Letters in Drug Design & Discovery, 2014, vol. 11, pp. 207-210.

* cited by examiner

*Primary Examiner* — Laura L Stockton
(74) *Attorney, Agent, or Firm* — Vorys, Sater, Seymour and Pease LLP; Mih Suhn Koh

(57) ABSTRACT

Provided are a 2-arylthiazole derivative or pharmaceutically acceptable salt thereof having a specific carboxamide moiety, including a substituted aminoalkyl-carboxamide moiety, a N-containing heterocyclic-alkyl-carboxamide moiety, or a N-containing heterocyclic-carboxamide moiety, a process for the preparation thereof, and a pharmaceutical composition comprising the same.

11 Claims, 3 Drawing Sheets

2-ARYLTHIAZOLE DERIVATIVE OR SALT THEREOF, PREPARATION METHOD THEREFOR, AND PHARMACEUTICAL COMPOSITION COMPRISING SAME

TECHNICAL FIELD

The present invention relates to a novel 2-arylthiazole derivative or salt thereof, a process for the preparation thereof, and a pharmaceutical composition comprising the same. More specifically, the present invention relates to a novel 2-arylthiazole derivative or pharmaceutically acceptable salt thereof having a specific carboxamide moiety, for example a substituted aminoalkyl-carboxamide moiety, a N-containing heterocyclic-alkyl-carboxamide moiety, or a N-containing heterocyclic-carboxamide moiety, a process for the preparation thereof, and a pharmaceutical composition comprising the same. The 2-arylthiazole derivative or pharmaceutically acceptable salt thereof according to the present invention has an excellent autophagy-inducing activity.

BACKGROUND ART

Autophagy, which is also referred to as autophagocytosis, is the natural regulated mechanism of the cell that disassembles unnecessary or dysfunctional components. It allows the orderly degradation and recycling of cellular components. During the process of autophagy, expendable cytoplasmic constituents are isolated from the rest of the cell within a double-membraned vesicle known as an autophagosome. Then, the autophagosome fuses with an available lysosome and eventually the contents of the vesicle are degraded and recycled. Three forms of autophagy are commonly described: macroautophagy, microautophagy, and chaperone-mediated autophagy (CMA). In disease, autophagy has been seen as an adaptive response to stress, promoting survival of the cell, but in other cases it appears to promote cell death and morbidity. In the extreme case of starvation, the breakdown of cellular components promotes cellular survival by maintaining cellular energy levels.

Meanwhile, when autophagy is reduced, various diseases may be caused by accumulation of misfolded proteins and so on. For example, it has been reported that the induction of autophagy can treat neurodegenerative diseases such as Huntington's disease (HD), Parkinson's disease (PD), Alzheimer's disease (AD), prion disease, multiple sclerosis, and amyotrophic lateral sclerosis (Lou Gehrig's disease) (e.g., Korean Patent No. 10-1731908). And also, it has been reported that the induction of autophagy can treat hepatic diseases such as liver fibrosis, liver cirrhosis, hepatitis, and fatty liver disease (e.g., Korean Laid-open Publication No. 10-2017-0022790). In addition, it has been reported that the induction of autophagy can treat metabolic diseases such as diabetes, hyperlipidemia, obesity, and inflammation (e.g., Korean Laid-open Publication No. 10-2018-0007307). Besides, it has been reported that the induction of autophagy can inhibit excessive immune responses associated with sepsis (e.g., Korean Laid-open Publication No. 10-2012-0131401).

Therefore, it is expected that a material inducing autophagy can be usefully applied for preventing or treating various diseases associated with autophagy, such as neurodegenerative diseases, hepatic diseases, metabolic diseases, sepsis, and so on.

DETAILED DESCRIPTION OF THE INVENTION

Technical Problem

The present inventors found that a novel 2-arylthiazole derivative or pharmaceutically acceptable salt thereof having a specific carboxamide moiety, for example a substituted aminoalkyl-carboxamide moiety, a N-containing heterocyclic-alkyl-carboxamide moiety, or a N-containing heterocyclic-carboxamide moiety, has an excellent autophagy-inducing activity, and therefore can be usefully applied for preventing or treating various diseases associated with autophagy.

Therefore, the present invention provides said 2-arylthiazole derivative or pharmaceutically acceptable salt thereof, a process for the preparation thereof, a pharmaceutical composition comprising the same, and a use thereof.

Technical Solution

In accordance with an aspect of the present invention, there is provided a novel 2-arylthiazole derivative or pharmaceutically acceptable salt thereof.

In accordance with another aspect of the present invention, there is provided a process for preparing said 2-arylthiazole derivative or pharmaceutically acceptable salt thereof.

In accordance with still another aspect of the present invention, there is provided a pharmaceutical composition comprising said 2-arylthiazole derivative or pharmaceutically acceptable salt thereof as an active ingredient.

In accordance with still another aspect of the present invention, there is provided a method for treating an autophagy-associated disease, comprising administering said 2-arylthiazole derivative or pharmaceutically acceptable salt thereof.

In accordance with still another aspect of the present invention, there is provided a use of said 2-arylthiazole derivative or pharmaceutically acceptable salt thereof for the manufacture of a medicament for preventing or treating an autophagy-associated disease.

Advantageous Effects

The compound of the present invention, i.e., the novel 2-arylthiazole derivative or pharmaceutically acceptable salt thereof having a specific carboxamide moiety, for example a substituted aminoalkyl-carboxamide moiety, a N-containing heterocyclic-alkyl-carboxamide moiety, or a N-containing heterocyclic-carboxamide moiety, has an excellent autophagy-inducing activity. Therefore, the compound or pharmaceutically acceptable salt thereof according to the present invention can be usefully applied for preventing or treating various diseases associated with autophagy, including neurodegenerative diseases, hepatic diseases, metabolic diseases, sepsis, and so on.

DESCRIPTION OF DRAWINGS

FIG. 1 shows the results obtained by analyzing autophagy fluxes of the compounds according to the present invention in N2a cells.

BEST MODE FOR CARRYING OUT THE INVENTION

Figure 1A:
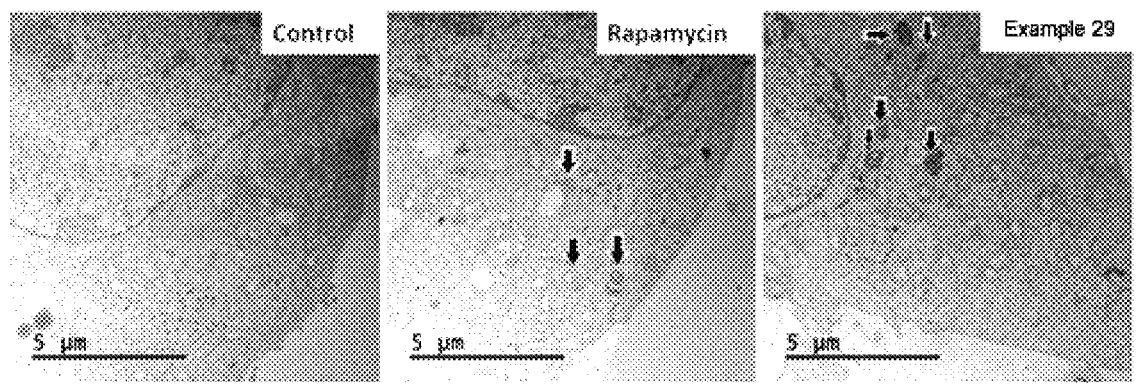
FIG. 1a shows the results obtained by imaging the entire cells through a mosaic technique, where the arrows indicate an autophagy.

As used herein, the term "alkyl" refers to a straight or branched aliphatic hydrocarbon radical. For example, $C_1$-$C_6$ alkyl means a straight or branched aliphatic hydrocarbon having 1 to 6 carbon atoms, such as methyl, ethyl, propyl, n-butyl, n-pentyl, n-hexyl, isopropyl, isobutyl, sec-butyl, tert-butyl, neopentyl, and isopentyl.

The term "hydroxy" refers to the —OH radical. The term "alkoxy" refers to a radical formed by substituting the hydrogen atom of a hydroxy group with an alkyl.

For example, $C_1$-$C_6$ alkoxy includes methoxy, ethoxy, propoxy, n-butoxy, n-pentyloxy, isopropoxy, isobutoxy, sec-butoxy, tert-butoxy, neopentyloxy, and isopentyloxy.

The term "amino" refers to the —$NH_2$ radical. The term "alkylamino" refers to an amino group substituted with a mono- or di-alkyl. For example, $C_{1-6}$ alkylamino includes an amino group substituted with mono- or di-$C_{1-6}$ alkyl.

The present invention provides a compound or salt thereof having an excellent autophagy-inducing activity, i.e., a compound of Formula 1 or pharmaceutically acceptable salt thereof:

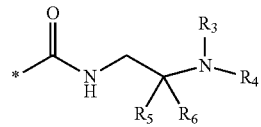

<Formula 1> wherein,
$R_1$ is hydrogen; a $C_1$~$C_4$ alkyl group; or a $C_1$~$C_4$ alkyl group substituted with a mono- or di-$C_1$~$C_5$ alkylamino,
$R_2$ is a $C_1$~$C_4$ alkyl group,
A is a group selected from the group consisting of the following groups of Formula 1a to 1d,

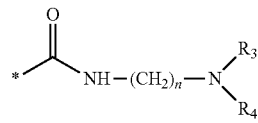

<Formula 1a>

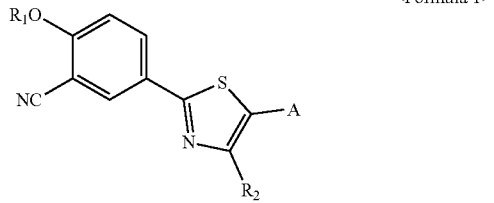

<Formula 1b>

<Formula 1c>

<Formula 1d> in the Formula 1a to 1d,
* represents the position attached to the compound of Formula 1,
n is 1, 2, or 3,
$R_3$ and $R_4$, independently of each other, are hydrogen or $C_1$~$C_4$ alkyl; or $R_3$ and $R_4$ are jointed each other, with the nitrogen atom to which they are attached, to form piperidine, morpholine, or pyrrolidine, wherein the piperidine, morpholine, or pyrrolidine is optionally substituted with $C_1$~$C_4$ alkyl,
$R_5$ and $R_6$ are $C_1$~$C_4$ alkyl; or $R_5$ and $R_6$ form a ring to form cyclopentane, cyclohexane or tetrahydropyran, and
Cy is a nitrogen-containing heterocyclic group selected from the group consisting of homopiperazinyl, piperidinyl, morpholinyl, and pyrrolidinyl, wherein the nitrogen-containing heterocyclic group is optionally substituted with $C_1$~$C_4$ alkyl or benzyl.

In the compound or pharmaceutically acceptable salt thereof of the present invention, $R_1$ may be preferably hydrogen; an isobutyl group; or a diethylaminoethyl group and $R_2$ may be preferably a methyl group.

In the compound or pharmaceutically acceptable salt thereof of the present invention, A is a group selected from the group consisting of the groups of Formula 1a to 1d. In an embodiment of the present invention, A may be the group of Formula 1a or the group of Formula 1b. The compounds of the present invention, in which A is the group of Formula 1a or the group of Formula 1b, have the following structures of Formula 11a and 11b.

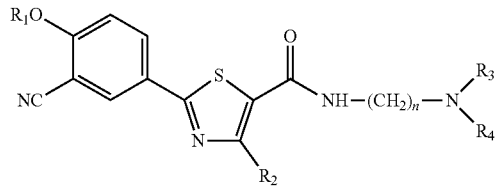

<Formula 11a>

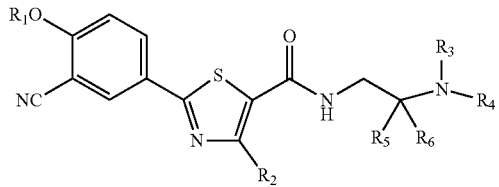

<Formula 11b>

In the compounds of Formula 11a and 11b, $R_1$, $R_2$, $R_3$, $R_4$, $R_5$, and $R_6$ are the same as defined in the above.

In the compounds of Formula 11a and 11b, $R_3$ and $R_4$ may be preferably jointed each other, with the nitrogen atom to which they are attached, to form piperidine, morpholine, or pyrrolidine. More preferably, the piperidine, morpholine, or pyrrolidine may be substituted with $C_1$~$C_4$ alkyl.

More preferably, the compound or pharmaceutically acceptable salt thereof of the present invention may be one or more selected from the group consisting of:

N-(2-(diethylamino)ethyl)-2-(3-cyano-4-isobutoxyphenyl)-4-methylthiazole-5-carboxamide hydrochloride;
N-(2-(diisopropylamino)ethyl)-2-(3-cyano-4-isobutoxyphenyl)-4-methylthiazole-5-carboxamide hydrochloride;
N-(2-(dimethylamino)ethyl)-2-(3-cyano-4-isobutoxyphenyl)-4-methylthiazole-5-carboxamide hydrochloride;
N-(3-(diethylamino)propyl)-2-(3-cyano-4-isobutoxyphenyl)-4-methylthiazole-5-carboxamide hydrochloride;
N-(4-methylhomopiperazino)-2-(3-cyano-4-isobutoxyphenyl)-4-methylthiazole-5-carboxamide hydrochloride;
N-(4-(1-methyl)piperidinyl)-2-(3-cyano-4-isobutoxyphenyl)-4-methylthiazole-5-carboxamide hydrochloride;
N-(2-(4-morpholino)ethyl)-2-(3-cyano-4-isobutoxyphenyl)-4-methylthiazole-5-carboxamide hydrochloride;
N-(2-(1-pyrrolidino)ethyl)-2-(3-cyano-4-isobutoxyphenyl)-4-methylthiazole-5-carboxamide hydrochloride;
N-(2-(1-piperidino)ethyl)-2-(3-cyano-4-isobutoxyphenyl)-4-methylthiazole-5-carboxamide hydrochloride;
N-((4-(dimethylamino)tetrahydro-2H-pyran-4-yl)methyl)-2-(3-cyano-4-isobutoxyphenyl)-4-methylthiazole-5-carboxamide hydrochloride;
N-((1-(dimethylamino)cyclopentyl)methyl)-2-(3-cyano-4-isobutoxyphenyl)-4-methylthiazole-5-carboxamide hydrochloride;
N-((1-(dimethylamino)cyclohexyl)methyl)-2-(3-cyano-4-isobutoxyphenyl)-4-methylthiazole-5-carboxamide hydrochloride;
N-(3-(1-benzyl)pyrrolidinyl)-2-(3-cyano-4-isobutoxyphenyl)-4-methylthiazole-5-carboxamide hydrochloride;
N-(2-(2-(1-methyl)pyrrolidino)ethyl)-2-(3-cyano-4-isobutoxyphenyl)-4-methylthiazole-5-carboxamide hydrochloride;
N—((S)-2-(1-ethyl)pyrrolidinomethyl)-2-(3-cyano-4-isobutoxyphenyl)-4-methylthiazole-5-carboxamide hydrochloride;
N-(4-morpholinamino)-2-(3-cyano-4-isobutoxyphenyl)-4-methylthiazole-5-carboxamide hydrochloride;
N-(1-piperidinamino)-2-(3-cyano-4-isobutoxyphenyl)-4-methylthiazole-5-carboxamide hydrochloride;
N-(2-(diisopropylamino)ethyl)-2-(3-cyano-4-hydroxyphenyl)-4-methylthiazole-5-carboxamide hydrochloride;
N-(2-(diethylamino)ethyl)-2-(3-cyano-4-hydroxyphenyl)-4-methylthiazole-5-carboxamide hydrochloride;
N-(2-(dimethylamino)ethyl)-2-(3-cyano-4-hydroxyphenyl)-4-methylthiazole-5-carboxamide hydrochloride;
N-(2-(4-morpholino)ethyl)-2-(3-cyano-4-hydroxyphenyl)-4-methylthiazole-5-carboxamide hydrochloride;
N—((S)-2-(1-ethyl)pyrrolidinomethyl)-2-(3-cyano-4-hydroxyphenyl)-4-methylthiazole-5-carboxamide hydrochloride;
N-(2-(diisopropylamino)ethyl)-2-(4-(2-diethylamino)ethoxy-3-cyanophenyl)-4-methylthiazole-5-carboxamide hydrochloride;
N-(2-(diethylamino)ethyl)-2-(4-(2-diethylamino)ethoxy-3-cyanophenyl)-4-methylthiazole-5-carboxamide hydrochloride;
N-(2-(dimethylamino)ethyl)-2-(4-(2-diethylamino)ethoxy-3-cyanophenyl)-4-methylthiazole-5-carboxamide hydrochloride;
N-(2-(4-morpholino)ethyl)-2-(4-(2-diethylamino)ethoxy-3-cyanophenyl)-4-methylthiazole-5-carboxamide hydrochloride;
N—((S)-2-(1-ethyl)pyrrolidinomethyl)-2-(4-(2-diethylamino)ethoxy-3-cyanophenyl)-4-methylthiazole-5-carboxamide hydrochloride;
N-((4-(dimethylamino)tetrahydro-2H-pyran-4-yl)methyl)-2-(3-cyano-4-hydroxyphenyl)-4-methylthiazole-5-carboxamide hydrochloride; and
N-((4-(dimethylamino)tetrahydro-2H-pyran-4-yl)methyl)-2-(4-(2-diethylamino)ethoxy-3-cyanophenyl)-4-methylthiazole-5-carboxamide hydrochloride.

Particularly preferably, the compound or pharmaceutically acceptable salt thereof of the present invention may be one or more selected from the group consisting of:

N-(2-(diisopropylamino)ethyl)-2-(3-cyano-4-isobutoxyphenyl)-4-methylthiazole-5-carboxamide hydrochloride;
N-((4-(dimethylamino)tetrahydro-2H-pyran-4-yl)methyl)-2-(3-cyano-4-isobutoxyphenyl)-4-methylthiazole-5-carboxamide hydrochloride;
N-(2-(diisopropylamino)ethyl)-2-(4-(2-diethylamino)ethoxy-3-cyanophenyl)-4-methylthiazole-5-carboxamide hydrochloride;
N-(2-(4-morpholino)ethyl)-2-(4-(2-diethylamino)ethoxy-3-cyanophenyl)-4-methylthiazole-5-carboxamide hydrochloride;
N-((4-(dimethylamino)tetrahydro-2H-pyran-4-yl)methyl)-2-(3-cyano-4-hydroxyphenyl)-4-methylthiazole-5-carboxamide hydrochloride; and
N-((4-(dimethylamino)tetrahydro-2H-pyran-4-yl)methyl)-2-(4-(2-diethylamino)ethoxy-3-cyanophenyl)-4-methylthiazole-5-carboxamide hydrochloride.

The compound of Formula 1 may be in a pharmaceutically acceptable salt form, for example in an acid addition salt form. The acid addition salt may be a salt derived from an inorganic acid or an organic acid, such as hydrochloride, hydrobromide, hydroiodide, nitrate, sulfate, hydrogen sulfate, phosphate, acetate, lactate, citrate, tartrate, succinate, maleate, malonate, oxalate, fumarate, gluconate, saccharate, benzoate, methanesulfonate, ethanesulfonate, benzenesulfonate, p-toluenesulfonate, pamoate, and the like, but not limited thereto. The acid addition salt may be prepared by reacting the compound of Formula 1 with an inorganic acid or an organic acid in a conventional solvent, e.g., water, alcohol, tetrahydrofuran, acetone, or a mixture thereof.

The compound of Formula 1 or pharmaceutically acceptable salt thereof according to the present invention may be in an anhydrous form, in a hydrate form or in a solvate form. In addition, the compound of Formula 1 or pharmaceutically acceptable salt thereof according to the present invention may be in an amorphous form or in a crystalline form. Said amorphous or crystalline form may be also in a hydrate form or in a solvate form. The hydrate or solvate may comprise water or an organic solvent in a stoichiometric or non-stoichiometric amount to the compound of Formula 1.

The compound of Formula 1 or pharmaceutically acceptable salt thereof may have substituent(s) containing asymmetric carbon and therefore be in the form of racemic mixture (RS) or in forms of optical isomers, such as (R) or (S) isomer. Therefore, unless otherwise indicated, the compound of Formula 1 or pharmaceutically acceptable salt thereof comprises both racemic mixture (RS) and optical isomers such as (R) or (S) isomer.

The present invention also includes, within its scope, a process for preparing the compound of Formula 1 or pharmaceutically acceptable salt thereof. For example, the compound of Formula 1 or pharmaceutically acceptable salt thereof may be prepared by acylating a compound of Formula 2 with a N-containing compound to prepare a compound of Formula 1, or by acylating a compound of Formula 3 with a N-containing compound to prepare a compound of Formula 4; and alkylating the compound of Formula 4 with $R_1X$ of Formula 5 to prepare a compound of Formula 1, as shown in the following Reaction Scheme 1:

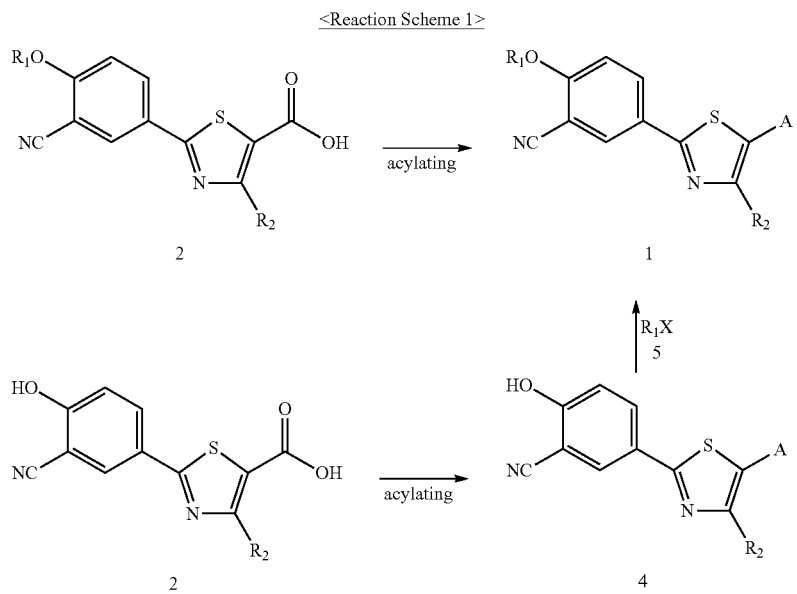

In the Reaction Scheme 1, $R_1$, $R_2$, and A are the same as defined in the above and X is halogen.

In an embodiment, the present invention provides a process for preparing a compound of Formula 1 or pharmaceutically acceptable salt thereof, the process comprising acylating a compound of Formula 2 with a N-containing compound selected from the group consisting of $NH_2$—$(CH_2)_n$—$NR_3R_4$, $NH_2$—$CH_2$—$CR_5R_6$—$NR_3R_4$, Cy, and $NH_2$-Cy (wherein n, $R_3$, $R_4$, $R_5$, and $R_6$ are the same as defined in the above; Cy is a nitrogen-containing heterocycle selected from the group consisting of homopiperaze, piperidine, morpholine, and pyrrolidine, wherein the nitrogen-containing heterocycle is optionally substituted with $C_1$~$C_4$ alkyl or benzyl; and $NH_2$-Cy is a nitrogen-containing heterocyclic amine selected from the group consisting of homopiperazinylamine, piperidinylamine, morpholinylamine, and pyrrolidinylamine, wherein the nitrogen-containing heterocyclic amine is optionally substituted with $C_1$~$C_4$ alkyl or benzyl):

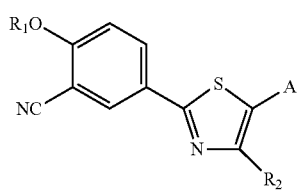

<Formula 1>

-continued

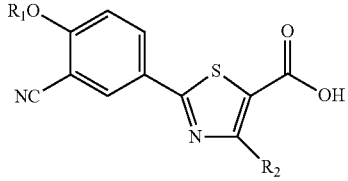

<Formula 2> wherein, $R_1$, $R_2$, and A are the same as defined in the above.

In another embodiment, the present invention provides a process for preparing a compound of Formula 1 or pharmaceutically acceptable salt thereof, the process comprising acylating a compound of Formula 3 with a N-containing compound selected from the group consisting of $NH_2$—$(CH_2)_n$—$NR_3R_4$, $NH_2$—$CH_2$—$CR_5R_6$—$NR_3R_4$, Cy, and $NH_2$-Cy (wherein n, $R_3$, $R_4$, $R_5$, and $R_6$ are the same as defined in the above; Cy is a nitrogen-containing heterocycle selected from the group consisting of homopiperaze, piperidine, morpholine, and pyrrolidine, wherein the nitrogen-containing heterocycle is optionally substituted with $C_1$~$C_4$ alkyl or benzyl; and $NH_2$-Cy is a nitrogen-containing heterocyclic amine selected from the group consisting of homopiperazinylamine, piperidinylamine, morpholinylamine, and pyrrolidinylamine, wherein the nitrogen-containing heterocyclic amine is optionally substituted with $C_1$~$C_4$ alkyl or benzyl) to prepare a compound of Formula 4; and alkylating the compound of Formula 4 with a compound of Formula 5 to prepare a compound of Formula 1:

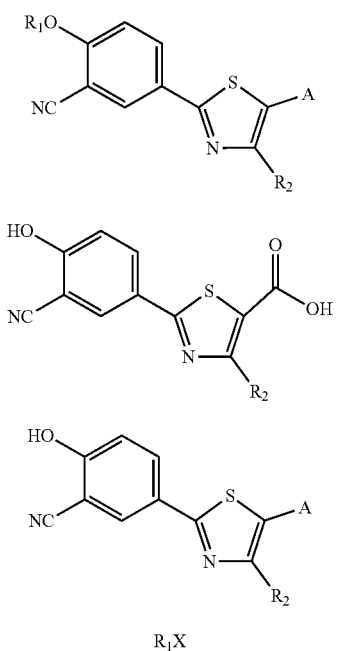

wherein, $R_1$, $R_2$, and A are the same as defined in the above, and X is halogen.

The compound of Formula 2, the compound of Formula 3, and the N-containing compound (i.e., $NH_2$—$(CH_2)_n$—$NR_3R_4$, $NH_2$—$CH_2$—$CR_5R_6$—$NR_3R_4$, Cy, or $NH_2$-Cy) are known compounds and thus commercially available. The acylating may be carried out by using an acylating agent, such as 1-ethyl-3-(3-dimethylaminopropyl)carbodiimide (EDC), dicyclohexylcarbodiimide (DCC), 1,1'-carbonyl-diimidazole (CDI), N-ethoxycarbonyl-2-ethoxy-1,2-dihydroquinoline (EEDQ). The acylating may be also carried out by reacting the compound of Formula 2 or the compound of Formula 3 with thionyl chloride, oxalyl chloride, phosphorus chloride, and the like to prepare acyl chloride, followed by reacting the N-containing compound therewith. The acylating may be carried out in a conventional organic solvent, e.g., dichloromethane, dimethylformamide, etc.

The alkylating may be carried out in the presences of an alkali metal base such as sodium hydroxide or sodium carbonate. The reaction between the compound of Formula 4 and the $R_1X$ of Formula 5 may be carried out in a molar ratio ranging from 1:1 to 1:5, preferably in a molar ratio of about 1:1. The alkylating may be carried out in water, $C_1$~$C_4$ alcohol, acetone, tetrahydrofuran, toluene, or a mixture thereof.

The 2-arylthiazole derivative of the present invention, i.e., the compound of Formula 1 or pharmaceutically acceptable salt thereof, has an excellent autophagy-inducing activity. Therefore, the compound of Formula 1 or pharmaceutically acceptable salt thereof of the present invention can be usefully applied for preventing or treating various diseases associated with autophagy, including neurodegenerative diseases, hepatic diseases, metabolic diseases, sepsis, and so on.

Therefore, the present invention includes, within its scope, a pharmaceutical composition for inducing autophagy, comprising a therapeutically effective amount of the compound of Formula 1 or pharmaceutically acceptable salt thereof as an active ingredient.

The diseases associated with autophagy includes, without limitation, various diseases that can be prevented, ameliorated, or treated through the induction of autophagy. For example, the pharmaceutical composition of the present invention may be a pharmaceutical composition for preventing or treating neurodegenerative diseases selected from the group consisting of Huntington's disease, Parkinson's disease, Alzheimer's disease, prion disease, multiple sclerosis, and Lou Gehrig's disease; hepatic diseases selected from the group consisting of liver fibrosis, liver cirrhosis, hepatitis, and fatty liver disease; metabolic diseases selected from the group consisting of diabetes, hyperlipidemia, obesity, and inflammation; or sepsis.

The pharmaceutical composition of the present invention may comprise a pharmaceutically acceptable carrier, such as diluents, disintegrants, sweeteners, lubricants, or flavoring agents. The pharmaceutical composition may be formulated to an oral dosage form such as tablets, capsules, powders, granules, suspensions, emulsions, or syrups; or a parenteral dosage form such as external solutions, external suspensions, external emulsions, gels (e.g., ointments), inhalants, sprays, injections, according to conventional methods. The dosage form may be various forms, e.g., dosage forms for single administration or for multiple administrations.

The pharmaceutical composition of the present invention may comprise, for example, a diluent (e.g., lactose, corn starch, etc.); a lubricant (e.g., magnesium stearate); an emulsifying agent; a suspending agent; a stabilizer; and/or an isotonic agent. If necessary, the composition further comprises sweeteners and/or flavoring agents.

The composition of the present invention may be administered orally or parenterally, including inhalable, intravenous, intraperitoneal, subcutaneous, intracerebroventricular, rectal and topical routes of administration. Therefore, the composition of the present invention may be formulated into various forms such as tablets, capsules, aqueous solutions or suspensions. In the case of tablets for oral administration, carriers such as lactose, corn starch, and lubricating agents, e.g. magnesium stearate, are conventionally used. In the case of capsules for oral administration, lactose and/or dried corn starch may be used as a diluent. When an aqueous suspension is required for oral administration, the active ingredient may be combined with emulsifying and/or suspending agents. If desired, certain sweetening and/or flavoring agents may be used. For intramuscular, intraperitoneal, subcutaneous and intravenous administration, sterile solutions of the active ingredient are usually prepared, and the pH of the solutions should be suitably adjusted and buffered. For intravenous administration, the total concentration of solutes should be controlled in order to render the preparation isotonic. The composition of the present invention may be in the form of an aqueous solution containing pharmaceutically acceptable carriers, e.g., saline having a pH level of 7.4. The solutions may be introduced into a patient's intramuscular blood-stream by local bolus injection.

The 2-arylthiazole derivative of the present invention, i.e., the compound of Formula 1 or pharmaceutically acceptable salt thereof, may be administered in a therapeutically effective amount ranging from about 0.0001 mg/kg to about 100 mg/kg per day, preferably from about 0.001 mg/kg to about 100 mg/kg per day, to a subject patient. The administration may be carried out, via oral or parenteral route, once or several times a day. Of course, the dose may be changed according to the patient's age, condition, weight, susceptibility, degree of disease, route of administration, duration of administration, and the like. Depending on the method of administration, the pharmaceutical composition according to the present invention may contain the compound of Formula 1 or pharmaceutically acceptable salt thereof in an amount ranging from 0.001 to 99% by weight, preferably 0.01 to 60% by weight.

The present invention also includes, within its scope, a method for inducing autophagy in a mammal in need thereof, comprising administering to the mammal an therapeutically effective amount of the compound of Formula 1 or pharmaceutically acceptable salt thereof. For example, the present invention includes a method for preventing or treating neurodegenerative diseases selected from the group consisting of Huntington's disease, Parkinson's disease, Alzheimer's disease, prion disease, multiple sclerosis, and Lou Gehrig's disease; hepatic diseases selected from the group consisting of liver fibrosis, liver cirrhosis, hepatitis, and fatty liver disease; metabolic diseases selected from the group consisting of diabetes, hyperlipidemia, obesity, and inflammation; or sepsis.

The present invention also includes, within its scope, a use of the compound of Formula 1 or pharmaceutically acceptable salt thereof for the manufacture of a medicament for inducing autophagy in a mammal in need thereof. For example, the present invention includes a use of the compound of Formula 1 or pharmaceutically acceptable salt thereof for the manufacture of a medicament for preventing or treating neurodegenerative diseases selected from the group consisting of Huntington's disease, Parkinson's disease, Alzheimer's disease, prion disease, multiple sclerosis, and Lou Gehrig's disease; hepatic diseases selected from the group consisting of liver fibrosis, liver cirrhosis, hepatitis, and fatty liver disease; metabolic diseases selected from the group consisting of diabetes, hyperlipidemia, obesity, and inflammation; or sepsis.

The following examples and test examples are provided for illustration purposes only, and are not intended to limit the scope of the invention.

The analyses of the compounds prepared in the following Examples were carried out as follows: Nuclear magnetic resonance (NMR) spectrum analysis was carried out using Bruker 400 MHz spectrometer and chemical shifts thereof were analyzed in ppm. Column chromatography was carried out on silica gel (Merck, 70-230 mesh). Unless otherwise indicated, all starting materials were purchased commercially and used without further purification. All reactions and chromatographic fractions were analyzed by thin layer chromatography (TLC) on a 250 nm silica gel plate and visualized by ultraviolet or iodine (12) staining. The products and intermediates were purified by flash chromatography or reverse phase HPLC.

Example 1: Preparation of N-(2-(diethylamino) ethyl)-2-(3-cyano-4-isobutoxyphenyl)-4-methylthiazole-5-carboxamide hydrochloride

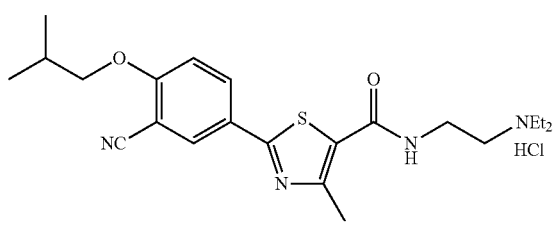

A mixture of 2-(3-cyano-4-isobutoxyphenyl)-4-methylthiazole-5-carboxylic acid (9.49 g), dichloromethane (100 ml), and dimethylformamide (0.25 ml) was stirred for 10 minutes. Thionyl chloride (4.28 g) was added to the mixture, which was then refluxed under stirring for 3 hours. The reaction mixture was cooled to room temperature and then concentrated under reduced pressure. Dichloromethane (90 ml) was added to the resulting concentrate, which was then cooled to 0~10° C. $K_2CO_3$ (5.30 g) was added to the reaction mixture, which was then stirred for 20 minutes. 2-(Diethylamino)ethylamine (3.49 g) was added to the mixture. The reaction mixture was stirred at room temperature for 2 hours, washed with purified water (100 ml), dried on anhydrous sodium sulfate, and then concentrated in vacuo to obtain N-(2-(diethylamino)ethyl)-2-(3-cyano-4-isobutoxyphenyl)-4-methylthiazole-5-carboxamide. The obtained compound was dissolved in a mixed solvent of methanol (70 ml) and dichloromethane (7 ml) and then a solution of 1N hydrochloric acid in ether (25 ml) was added thereto. The mixture was heated to 40° C. and then concentrated under reduced pressure. To the resulting concentrate, was added acetone (70 ml). The mixture was stirred for 1 hour and then filtered. The resulting solid was washed with acetone (10 ml) and then dried at 50-55° C. to obtain 6.50 g of the titled compound. (Yield: 66.3%)

TLC $R_f$=0.24 in 10% MeOH in Chloroform $^1$H NMR (400 MHz, MeOH-$d_4$) δ 8.26 (d, 1H, J=2.4 Hz), 8.22 (dd, 1H, J=2.4 Hz, 8.8 Hz), 7.33 (d, 1H, J=8.8 Hz), 4.03 (d, 2H, J=6.4 Hz), 3.78 (t, 2H, J=6.4 Hz), 3.42 (t, 2H, J=6.4 Hz), 3.40~3.32 (m, 4H), 2.74 (s, 3H), 2.25~2.15 (m, 1H), 1.40 (t, 6H, J=7.2 Hz), 1.12 (d, 6H, J=6.8 Hz)

Example 2: Preparation of N-(2-(diisopropylamino) ethyl)-2-(3-cyano-4-isobutoxyphenyl)-4-methylthiazole-5-carboxamide hydrochloride

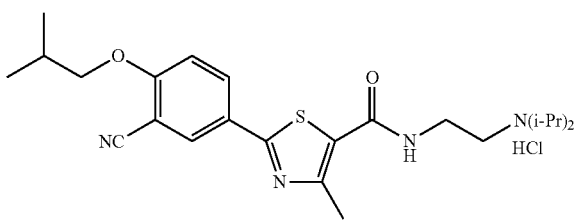

The titled compound was prepared in accordance with the same procedures as in Example 1, except for using 2-(diisopropylamino)ethylamine instead of 2-(diethylamino)ethylamine. (Yield: 55.5%)

TLC $R_f$=0.29 in 10% MeOH in Chloroform $^1$H NMR (400 MHz, MeOH-$d_4$) δ 8.23 (d, 1H, J=2.4 Hz), 8.20 (dd, 1H, J=2.4 Hz, 8.8 Hz), 7.30 (d, 1H, J=8.8 Hz), 4.01 (d, 2H, J=6.4 Hz), 3.90~3.82 (m, 2H), 3.75 (t, 2H, J=6.8 Hz), 3.38 (t, 2H, J=6.8 Hz), 2.72 (s, 3H), 2.25~2.15 (m, 1H), 1.46 (d, 12H, J=6.8 Hz), 1.12 (d, 6H, J=6.8 Hz)

Example 3: Preparation of N-(2-(dimethylamino)ethyl)-2-(3-cyano-4-isobutoxyphenyl)-4-methylthiazole-5-carboxamide hydrochloride

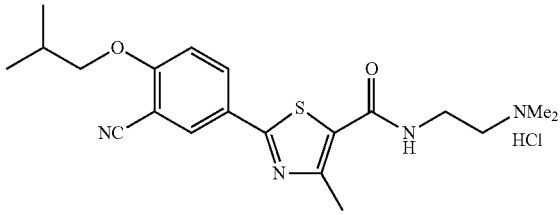 [SMILES: Cc1nc(-c2ccc(OCC(C)C)c(C#N)c2)sc1C(=O)NCCN(C)C ; Cl]

The titled compound was prepared in accordance with the same procedures as in Example 1, except for using 2-(dimethylamino)ethylamine instead of 2-(diethylamino)ethylamine. (Yield: 90.6%)

TLC $R_f$=0.34 in 10% MeOH in Chloroform $^1$H NMR (400 MHz, MeOH-$d_4$) δ 8.26 (d, 1H, J=2.4 Hz), 8.22 (dd, 1H, J=2.4 Hz, 8.8 Hz), 7.34 (d, 1H, J=9.2 Hz), 4.03 (d, 2H, J=6.4 Hz), 3.77 (t, 2H, J=6.0 Hz), 3.42 (t, 2H, J=6.0 Hz), 3.02 (s, 6H), 2.74 (s, 3H), 2.25~2.15 (m, 1H), 1.12 (d, 6H, J=6.8 Hz)

Example 4: Preparation of N-(3-(diethylamino)propyl)-2-(3-cyano-4-isobutoxyphenyl)-4-methylthiazole-5-carboxamide hydrochloride

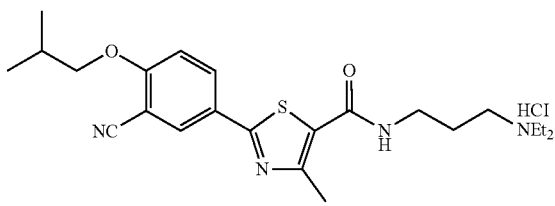

The titled compound was prepared in accordance with the same procedures as in Example 1, except for using 3-(diethylamino)propylamine instead of 2-(diethylamino)ethylamine. (Yield: 44.4%)

TLC $R_f$=0.17 in 10% MeOH in Chloroform $^1$H NMR (400 MHz, MeOH-$d_4$) δ 8.27 (d, 1H, J=2.4 Hz), 8.22 (dd, 1H, J=2.4 Hz, 8.8 Hz), 7.35 (d, 1H, J=8.8 Hz), 4.03 (d, 2H, J=6.4 Hz), 3.51 (t, 2H, J=6.4 Hz), 3.34~3.22 (m, 6H), 2.73 (s, 3H), 2.25~2.15 (m, 1H), 2.15~2.05 (m, 2H), 1.37 (t, 6H, J=7.2 Hz), 1.12 (d, 6H, J=6.4 Hz)

Example 5: Preparation of N-(4-methylhomopiperazino)-2-(3-cyano-4-isobutoxyphenyl)-4-methylthiazole-5-carboxamide hydrochloride

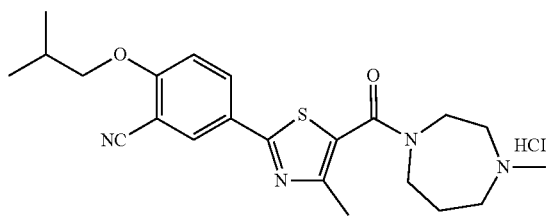

The titled compound was prepared in accordance with the same procedures as in Example 1, except for using N-methylhomopiperazine instead of 2-(diethylamino)ethylamine. (Yield: 45.3%)

TLC $R_f$=0.39 in 10% MeOH in Chloroform $^1$H NMR (400 MHz, MeOH-$d_4$) δ 8.23 (d, 1H, J=2.4 Hz), 8.20 (dd, 1H, J=2.4 Hz, 8.8 Hz), 7.33 (d, 1H, J=8.8 Hz), 4.32~4.18 (m, 1H), 4.02 (d, 2H, J=6.4 Hz), 3.90~3.60 (m, 5H), 3.45~3.35 (m, 2H), 3.00 (s, 3H), 2.52 (s, 3H), 2.35~2.25 (m, 2H), 2.25~2.15 (m, 1H), 1.12 (d, 6H, J=6.8 Hz)

Example 6: Preparation of N-(4-(1-methyl)piperidinyl)-2-(3-cyano-4-isobutoxyphenyl)-4-methylthiazole-5-carboxamide hydrochloride

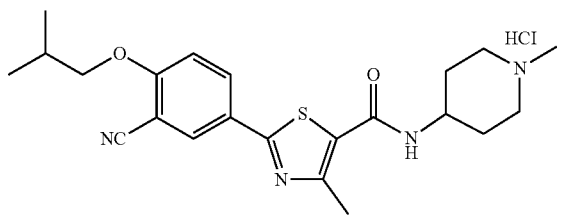

The titled compound was prepared in accordance with the same procedures as in Example 1, except for using 4-amino-1-methylpiperidine instead of 2-(diethylamino)ethylamine. (Yield: 62.4%)

TLC $R_f$=0.29 in 10% MeOH in Chloroform $^1$H NMR (400 MHz, MeOH-$d_4$) δ 8.24 (d, 1H, J=2.4 Hz), 8.20 (dd, 1H, J=2.4 Hz, 8.8 Hz), 7.33 (d, 1H, J=8.8 Hz), 4.20~4.10 (m, 1H), 4.02 (d, 2H, J=6.4 Hz), 3.65~3.55 (m, 2H), 3.25~3.15 (m, 2H), 2.97 (s, 3H), 2.68 (s, 3H), 2.35~2.25 (m, 2H), 2.25~2.15 (m, 1H), 2.05~1.90 (m, 2H), 1.12 (d, 6H, J=6.8 Hz)

Example 7: Preparation of N-(2-(4-morpholino)ethyl)-2-(3-cyano-4-isobutoxyphenyl)-4-methylthiazole-5-carboxamide hydrochloride

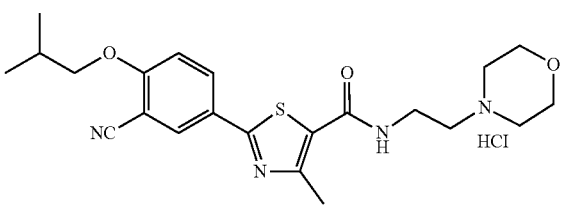

The titled compound was prepared in accordance with the same procedures as in Example 1, except for using 4-(2-aminoethyl)morpholine instead of 2-(diethylamino)ethylamine. (Yield: 64.9%)

TLC $R_f$=0.61 in 10% MeOH in Chloroform $^1$H NMR (400 MHz, MeOH-$d_4$) δ 8.26 (d, 1H, J=2.4 Hz), 8.22 (dd, 1H, J=2.4 Hz, 9.2 Hz), 7.34 (d, 1H, J=9.2 Hz), 4.12 (dd, 2H, J=3.2, 12.8 Hz), 4.03 (d, 2H, J=6.4 Hz), 3.92~3.85 (m, 2H), 3.85~3.78 (m, 2H), 3.73 (d, 2H, J=12.8 Hz), 3.44 (t, 2H, J=6.0 Hz), 3.30~3.20 (m, 2H), 2.74 (s, 3H), 2.25~2.15 (m, 1H), 1.12 (d, 6H, J=6.8 Hz)

Example 8: Preparation of N-(2-(1-pyrrolidino)ethyl)-2-(3-cyano-4-isobutoxyphenyl)-4-methylthiazole-5-carboxamide hydrochloride

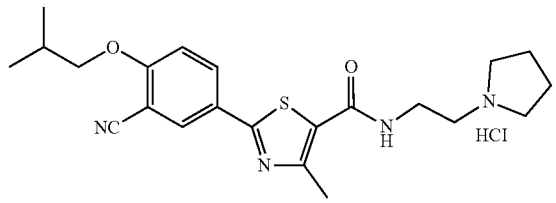

The titled compound was prepared in accordance with the same procedures as in Example 1, except for using 1-(2-aminoethyl)pyrrolidine instead of 2-(diethylamino)ethylamine. (Yield: 59.5%)

TLC $R_f$=0.14 in 10% MeOH in Chloroform $^1$H NMR (400 MHz, MeOH-$d_4$) δ 8.26 (d, 1H, J=2.4 Hz), 8.22 (dd, 1H, J=2.4 Hz, 9.2 Hz), 7.35 (d, 1H, J=8.8 Hz), 4.03 (d, 2H, J=6.4 Hz), 3.88~3.80 (m, 2H), 3.77 (t, 2H, J=6.0 Hz), 3.48 (t, 2H, J=6.0 Hz), 3.25~3.15 (m, 2H), 2.75 (s, 3H), 2.25~2.15 (m, 3H), 2.15~2.05 (m, 2H), 1.12 (d, 6H, J=6.8 Hz)

Example 9: Preparation of N-(2-(1-piperidino)ethyl)-2-(3-cyano-4-isobutoxyphenyl)-4-methylthiazole-5-carboxamide hydrochloride

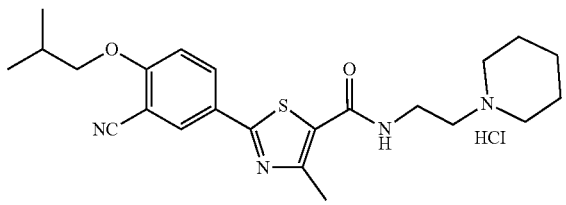

The titled compound was prepared in accordance with the same procedures as in Example 1, except for using 1-(2-aminoethyl)piperidine instead of 2-(diethylamino)ethylamine. (Yield: 72.7%)

TLC $R_f$=0.33 in 10% MeOH in Chloroform $^1$H NMR (400 MHz, MeOH-$d_4$) δ 8.25 (d, 1H, J=2.4 Hz), 8.21 (dd, 1H, J=2.4 Hz, 8.8 Hz), 7.33 (d, 1H, J=8.8 Hz), 4.03 (d, 2H, J=6.4 Hz), 3.77 (t, 2H, J=6.0 Hz), 3.73 (d, 2H, J=11.6 Hz), 3.37 (t, 2H, J=6.0 Hz), 3.10~3.00 (m, 2H), 2.73 (s, 3H), 2.25~2.15 (m, 1H), 2.05~1.95 (m, 2H), 1.93~1.83 (m, 3H), 1.62~1.53 (m, 1H), 1.12 (d, 6H, J=6.8 Hz)

Example 10: Preparation of N-((4-(dimethylamino)tetrahydro-2H-pyran-4-yl)methyl)-2-(3-cyano-4-isobutoxyphenyl)-4-methylthiazole-5-carboxamide hydrochloride

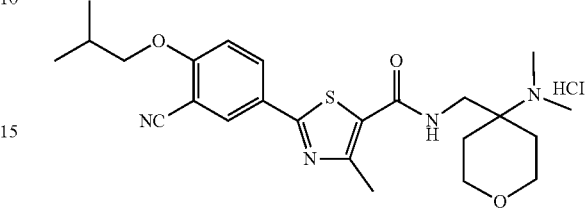

The titled compound was prepared in accordance with the same procedures as in Example 1, except for using 4-(aminomethyl)-N,N-dimethyltetrahydro-2H-pyran-4-amine instead of 2-(diethylamino)ethylamine. (Yield: 67.9%)

TLC $R_f$=0.44 in 10% MeOH in Chloroform $^1$H NMR (400 MHz, DMSO-$d_6$) δ 10.31 (t, 1H, J=4.8 Hz), 8.67 (t, 1H, J=6.4 Hz), 8.26 (d, 1H, J=2.4 Hz), 8.20 (dd, 1H, J=2.4 Hz, 8.8 Hz), 7.40 (d, 1H, J=8.8 Hz), 4.02 (d, 2H, J=6.4 Hz), 3.95~3.85 (m, 2H), 3.83 (d, 2H, J=6.4 Hz), 3.65~3.55 (m, 2H), 2.80 (s, 3H), 2.79 (s, 3H), 2.64 (s, 3H), 2.15~2.05 (m, 1H), 1.95~1.85 (m, 4H), 1.03 (d, 6H, J=6.4 Hz)

Example 11: Preparation of N-((1-(dimethylamino)cyclopentyl)methyl)-2-(3-cyano-4-isobutoxyphenyl)-4-methylthiazole-5-carboxamide hydrochloride

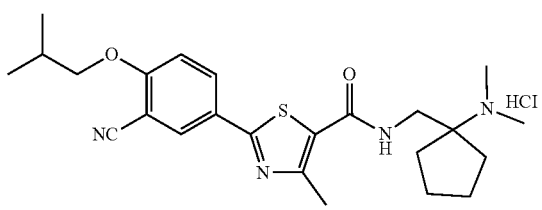

The titled compound was prepared in accordance with the same procedures as in Example 1, except for using 1-(aminomethyl)-N,N-dimethylcyclopentylamine instead of 2-(diethylamino)ethylamine. (Yield: 72.9%)

TLC $R_f$=0.34 in 10% MeOH in Chloroform $^1$H NMR (400 MHz, DMSO-$d_6$) δ 10.73 (t, 1H, J=4.8 Hz), 8.73 (t, 1H, J=6.4 Hz), 8.26 (d, 1H, J=2.4 Hz), 8.20 (dd, 1H, J=2.4 Hz, 8.8 Hz), 7.40 (d, 1H, J=8.8 Hz), 4.02 (d, 2H, J=6.4 Hz), 3.61 (d, 2H, J=6.4 Hz), 2.81 (s, 3H), 2.80 (s, 3H), 2.64 (s, 3H), 2.15~2.05 (m, 1H), 2.00~1.90 (m, 4H), 1.80~1.70 (m, 4H), 1.02 (d, 6H, J=6.8 Hz)

Example 12: Preparation of N-((1-(dimethylamino)cyclohexyl)methyl)-2-(3-cyano-4-isobutoxyphenyl)-4-methylthiazole-5-carboxamide hydrochloride

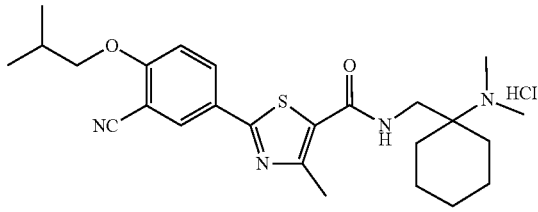

The titled compound was prepared in accordance with the same procedures as in Example 1, except for using 1-(aminomethyl)-N,N-dimethylcyclohexylamine instead of 2-(diethylamino)ethylamine. (Yield: 58.3%)

TLC $R_f$=0.31 in 10% MeOH in Chloroform $^1$H NMR (400 MHz, DMSO-$d_6$) δ 9.90 (s, 1H), 8.56 (t, 1H, J=6.0 Hz), 8.26 (d, 1H, J=2.4 Hz), 8.20 (dd, 1H, J=2.4 Hz, 8.8 Hz), 7.40 (d, 1H, J=8.8 Hz), 4.02 (d, 2H, J=6.4 Hz), 3.74 (d, 2H, J=6.4 Hz), 2.81 (s, 3H), 2.79 (s, 3H), 2.64 (s, 3H), 2.15~2.05 (m, 1H), 1.95~1.88 (m, 2H), 1.75~1.52 (m, 7H), 1.22~1.13 (m, 1H), 1.02 (d, 6H, J=6.8 Hz)

Example 13: Preparation of N-(3-(1-benzyl)pyrrolidinyl)-2-(3-cyano-4-isobutoxyphenyl)-4-methylthiazole-5-carboxamide hydrochloride

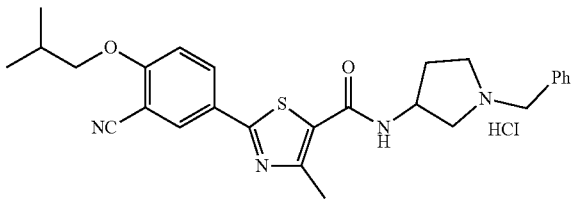

The titled compound was prepared in accordance with the same procedures as in Example 1, except for using 1-benzyl-3-aminopyrrolidine instead of 2-(diethylamino)ethylamine. (Yield: 43.4%)

TLC $R_f$=0.41 in 10% MeOH in Chloroform $^1$H NMR (400 MHz, DMSO-$d_6$) δ 11.20 (s, 1H), 8.73 (dd, 1H, J=6.4, 26 Hz), 8.25~8.15 (m, 2H), 7.65~7.60 (m, 2H), 7.50~7.40 (m, 4H), 4.73~4.45 (m, 1H), 4.42 (dd, 2H, J=6.0, 14 Hz), 4.02 (dd, 2H, J=2.8, 6.4 Hz), 3.60~3.40 (m, 2H), 3.40~3.30 (m, 1H), 3.22~3.10 (m, 1H), 2.62 (d, 3H, J=4.0 Hz), 2.15~2.05 (m, 1H), 1.02 (dd, 6H, J=1.6, 6.8 Hz)

Example 14: Preparation of N-(2-(2-(1-methyl)pyrrolidino)ethyl)-2-(3-cyano-4-isobutoxyphenyl)-4-methylthiazole-5-carboxamide hydrochloride

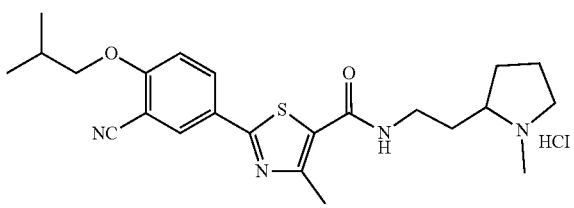

The titled compound was prepared in accordance with the same procedures as in Example 1, except for using 2-(2-aminoethyl)-1-methyl-pyrrolidine instead of 2-(diethylamino)ethylamine. (Yield: 85.3%)

TLC $R_f$=0.14 in 10% MeOH in Chloroform $^1$H NMR (400 MHz, D$_2$O) δ 7.58 (dd, 1H, J=2.4, 8.8 Hz), 7.51 (d, 1H, J=2.4 Hz), 6.88 (d, 1H, J=8.8 Hz), 3.72 (d, 2H, J=6.8 Hz), 3.68~3.60 (m, 1H), 3.37 (t, 2H, J=6.8 Hz), 3.32~3.25 (m, 1H), 3.27 (s, 2H), 3.15~3.05 (m, 1H), 2.87 (s, 3H), 2.35~2.25 (m, 1H), 2.25~2.15 (m, 1H), 2.15~1.92 (m, 3H), 1.85~1.70 (m, 2H), 0.92 (d, 6H, J=6.8 Hz)

Example 15: Preparation of N—((S)-2-(1-ethyl)pyrrolidinomethyl)-2-(3-cyano-4-isobutoxyphenyl)-4-methylthiazole-5-carboxamide hydrochloride

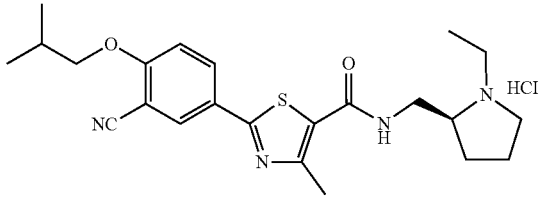

The titled compound was prepared in accordance with the same procedures as in Example 1, except for using (S)-2-(aminomethyl)-1-ethyl-pyrrolidine instead of 2-(diethylamino)ethylamine. (Yield: 63.6%)

TLC $R_f$=0.24 in 10% MeOH in Chloroform $^1$H NMR (400 MHz, DMSO-$d_6$) δ 10.39 (s, 1H), 8.74 (t, 1H, J=5.6 Hz), 8.25 (d, 1H, J=2.0 Hz), 8.19 (dd, 1H, J=2.0 Hz, 9.2 Hz), 7.40 (d, 1H, J=9.2 Hz), 4.01 (d, 2H, J=6.4 Hz), 3.75~3.52 (m, 4H), 3.45~3.35 (m, 1H), 3.13~3.03 (m, 2H), 2.65 (s, 3H), 2.20~1.80 (m, 5H), 1.29 (t, 3H, J=7.2 Hz), 1.02 (d, 6H, J=6.8 Hz)

Example 16: Preparation of N-(4-morpholinamino)-2-(3-cyano-4-isobutoxyphenyl)-4-methylthiazole-5-carboxamide hydrochloride

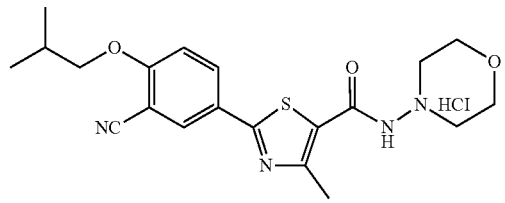

The titled compound was prepared in accordance with the same procedures as in Example 1, except for using 4-aminomorpholine instead of 2-(diethylamino)ethylamine. (Yield: 59.9%)

TLC $R_f$=0.69 in 10% MeOH in Chloroform $^1$H NMR (400 MHz, DMSO-$d_6$) δ 9.10 (s, 1H), 8.35 (s, 1H), 8.30~8.20 (m, 1H), 7.35~7.40 (m, 1H), 4.01 (d, 2H, J=6.4 Hz), 3.85~3.65 (m, 4H), 2.95~2.70 (m, 4H), 2.67 (s, 3H), 2.15~2.05 (m, 1H), 1.29 (t, 3H, J=7.2 Hz), 1.03 (d, 6H, J=6.8 Hz)

Example 17: Preparation of N-(1-piperidinamino)-2-(3-cyano-4-isobutoxyphenyl)-4-methylthiazole-5-carboxamide hydrochloride

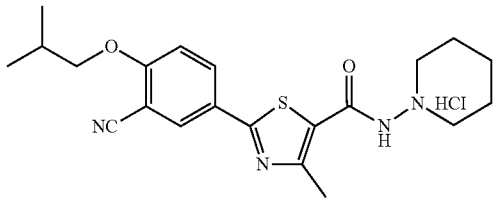

The titled compound was prepared in accordance with the same procedures as in Example 1, except for using 1-aminopiperidine instead of 2-(diethylamino)ethylamine. (Yield: 45.8%)

TLC $R_f$=0.39 in 10% MeOH in Chloroform
$^1$H NMR (400 MHz, DMSO-$d_6$) δ 9.01 (s, 1H), 8.28 (d, 1H, J=2.4 Hz), 8.23 (dd, 1H, J=2.0, 8.8 Hz), 7.38 (d, 1H, J=8.8 Hz), 4.01 (d, 2H, J=6.4 Hz), 3.25~3.20 (m, 1H), 3.05~2.95 (m, 2H), 2.72 (s, 3H), 2.70~2.65 (m, 1H), 2.15~2.05 (m, 1H), 1.82~1.65 (m, 6H), 1.03 (d, 6H, J=6.4 Hz)

Example 18: Preparation of N-(2-(diisopropylamino)ethyl)-2-(3-cyano-4-hydroxyphenyl)-4-methylthiazole-5-carboxamide hydrochloride

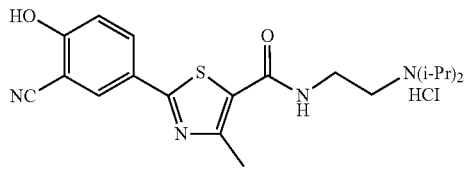

A mixture of 2-(3-cyano-4-hydroxyphenyl)-4-methylthiazole-5-carboxylic acid (3.00 g), hydroxybenzotriazole (1.71 g), dicyclohexylcarbodiimide (2.62 g) and dimethylformamide (30 ml) was stirred for 10 minutes. N-methylmorpholine (1.28 g) and 2-(diisopropylamino)ethylamine (1.83 g) were added to the mixture, which was heated to 50° C. and then stirred for 3 hours. The reaction mixture was cooled to 0~5° C. and then filtered to discard the resulting solid. The filtrate was concentrated under reduced pressure. The resulting oily concentrate was dissolved in 0.5N hydrochloric acid solution (60 ml) and purified water (60 ml) and then washed with ethyl acetate (60 ml×2 times). The aqueous layer was adjusted to pH 7~8 with sodium hydroxide (1.2 g) and extracted with dichloromethane (60 ml×2 times). The combined extract was dried on anhydrous sodium sulfate and then concentrated in vacuo to obtain N-(2-(diisopropylamino)ethyl)-2-(3-cyano-4-hydroxyphenyl)-4-methylthiazole-5-carboxamide. The compound was dissolved in methanol (10 ml) and then a solution of 1N hydrochloric acid in ether (20 ml) was added thereto. The mixture was heated to 40° C. and then acetone (30 ml) was added thereto. The mixture was stirred for 1 hour and then filtered. The resulting solid was washed with acetone (10 ml) and then dried at 50-55° C. to obtain 4.17 g of the titled compound. (Yield: 85.5%)

TLC $R_f$=0.20 in 20% MeOH in Chloroform
$^1$H NMR (400 MHz, MeOH-$d_4$) δ 8.18 (d, 1H, J=2.4 Hz), 8.09 (dd, 1H, J=2.4 Hz, 8.8 Hz), 7.11 (d, 1H, J=8.8 Hz), 3.90~3.82 (m, 2H), 3.74 (t, 2H, J=6.8 Hz), 3.38 (t, 2H, J=6.8 Hz), 2.73 (s, 3H), 1.46 (d, 12H, J=6.8 Hz)

Example 19: Preparation of N-(2-(diethylamino)ethyl)-2-(3-cyano-4-hydroxyphenyl)-4-methylthiazole-5-carboxamide hydrochloride

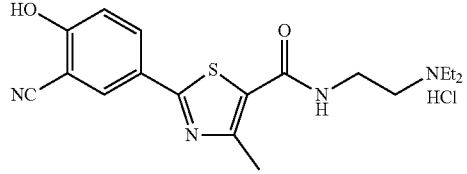

The titled compound was prepared in accordance with the same procedures as in Example 18, except for using 2-(diethylamino)ethylamine instead of 2-(diisopropylamino)ethylamine. (Yield: 40.0%)

TLC $R_f$=0.39 in 40% MeOH in Chloroform
$^1$H NMR (400 MHz, DMSO-$d_6$) δ 11.99 (s, 1H), 10.40 (s, 1H), 8.61 (t, 1H, J=6.0 Hz), 8.13 (d, 1H, J=2.4 Hz), 7.95 (dd, 1H, J=2.4 Hz, 8.8 Hz), 7.23 (d, 1H, J=8.8 Hz), 3.64 (q, 2H, J=6.4 Hz), 3.22 (q, 2H, J=6.4 Hz), 3.20~3.12 (m, 4H), 2.64 (s, 3H), 1.25 (t, 6H, J=7.2 Hz)

Example 20: Preparation of N-(2-(dimethylamino)ethyl)-2-(3-cyano-4-hydroxyphenyl)-4-methylthiazole-5-carboxamide hydrochloride

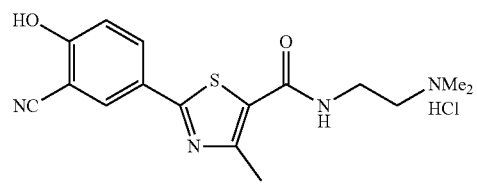 [SMILES: Cc1nc(-c2ccc(O)c(C#N)c2)sc1C(=O)NCCN(C)C ; Cl]

The titled compound was prepared in accordance with the same procedures as in Example 18, except for using 2-(dimethylamino)ethylamine instead of 2-(diisopropylamino)ethylamine. (Yield: 83.7%)

TLC $R_f$=0.18 in 40% MeOH in Chloroform
$^1$H NMR (400 MHz, DMSO-$d_6$) δ 11.97 (s, 1H), 10.19 (s, 1H), 8.52 (t, 1H, J=6.0 Hz), 8.13 (d, 1H, J=2.4 Hz), 8.05 (dd, 1H, J=2.4 Hz, 8.8 Hz), 7.22 (d, 1H, J=8.8 Hz), 3.62 (q, 2H, J=6.0 Hz), 3.25 (q, 2H, J=6.0 Hz), 2.83 (s, 3H), 2.82 (s, 3H), 2.64 (s, 3H)

Example 21: Preparation of N-(2-(4-morpholino)ethyl)-2-(3-cyano-4-hydroxyphenyl)-4-methylthiazole-5-carboxamide hydrochloride

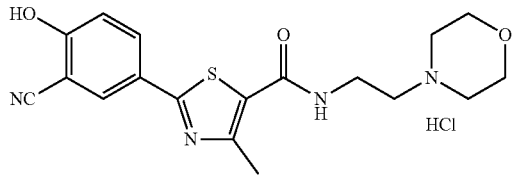 [SMILES: Cc1nc(-c2ccc(O)c(C#N)c2)sc1C(=O)NCCN1CCOCC1 ; Cl]

The titled compound was prepared in accordance with the same procedures as in Example 18, except for using 4-(2-aminoethyl)morpholine instead of 2-(diisopropylamino)ethylamine. (Yield: 73.2%)

TLC R$_f$=0.67 in 20% MeOH in Chloroform $^1$H NMR (400 MHz, DMSO-d$_6$) δ 12.03 (s, 1H), 11.24 (s, 1H), 8.64 (t, 1H, J=5.6 Hz), 8.13 (d, 1H, J=2.4 Hz), 8.05 (dd, 1H, J=2.4 Hz, 8.8 Hz), 7.24 (d, 1H, J=8.8 Hz), 4.00~3.80 (m, 4H), 3.68 (q, 2H, J=6.0 Hz), 3.58~3.48 (m, 2H), 3.45~3.35 (m, 2H), 3.25~3.15 (m, 2H), 2.64 (s, 3H)

Example 22: Preparation of N—((S)-2-(1-ethyl)pyrrolidinomethyl)-2-(3-cyano-4-hydroxyphenyl)-4-methylthiazole-5-carboxamide hydrochloride

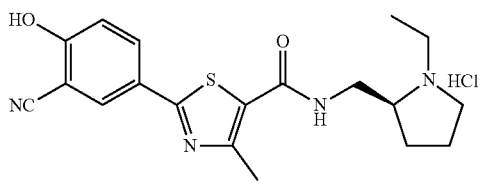 [SMILES: CCN1CCC[C@H]1CNC(=O)c1sc(-c2ccc(O)c(C#N)c2)nc1C ; Cl]

The titled compound was prepared in accordance with the same procedures as in Example 18, except for using (S)-2-(aminomethyl)-1-ethyl-pyrrolidine instead of 2-(diisopropylamino)ethylamine. (Yield: 23.5%)

TLC R$_f$=0.47 in 40% MeOH in Chloroform $^1$H NMR (400 MHz, DMSO-d$_6$) δ 11.96 (s, 1H), 10.43 (s, 1H), 8.71 (t, 1H, J=5.6 Hz), 8.14 (d, 1H, J=2.4 Hz), 8.06 (dd, 1H, J=2.4 Hz, 8.8 Hz), 7.21 (d, 1H, J=8.8 Hz), 3.75~3.52 (m, 4H), 3.45~3.35 (m, 1H), 3.13~3.03 (m, 2H), 2.64 (s, 3H), 2.20~2.10 (m, 1H), 2.05~1.80 (m, 3H), 1.29 (t, 3H, J=7.2 Hz)

Example 23: Preparation of N-(2-(diisopropylamino)ethyl)-2-(4-(2-diethylamino)ethoxy-3-cyanophenyl)-4-methylthiazole-5-carboxamide hydrochloride

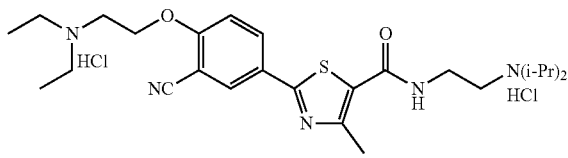

N-(2-(Diisopropylamino)ethyl)-2-(3-cyano-4-hydroxyphenyl)-4-methylthiazole-5-carboxamide hydrochloride (3.17 g) prepared in Example 18 was added to a solution of sodium hydroxide (1.26 g) dissolved in purified water (8 ml) and tetrahydrofuran (35 ml). To the mixture, was added 2-diethylaminoethyl chloride hydrochloride (1.30 g). The mixture was stirred at about 70° C. for 4 hours. The reaction mixture was cooled to room temperature and then the aqueous layer was removed by layer separation. The organic layer was concentrated under reduced pressure, dissolved in dichloromethane (50 ml), and then the aqueous layer was removed by layer separation. The organic layer was dried on anhydrous sodium sulfate, concentrated in vacuo, and then crystallized with diisopropyl ether (50 ml). The resulting crystal was filtered and then dried at 50-55° C. to obtain N-(2-(diisopropylamino)ethyl)-2-(4-(2-diethylamino)ethoxy-3-cyanophenyl)-4-methylthiazole-5-carboxamide. The compound was dissolved in methanol (5 ml) and then a solution of 1N hydrochloric acid in ether (15 ml) was added thereto. The mixture was heated to 40° C. and then acetone (30 ml) was added thereto. The mixture was stirred for 1 hour and then filtered. The resulting solid was washed with acetone (10 ml) and then dried at 50-55° C. to obtain 2.50 g of the titled compound. (Yield: 60.0%)

TLC R$_f$=0.33 in 20% MeOH in Chloroform $^1$H NMR (400 MHz, MeOH-d$_4$) δ 8.34 (d, 1H, J=2.4 Hz), 8.30 (dd, 1H, J=2.4 Hz, 8.8 Hz), 7.43 (d, 1H, J=8.8 Hz), 4.65 (t, 2H, J=4.8 Hz), 3.90~3.80 (m, 2H), 3.80~3.70 (m, 4H), 3.52~3.43 (m, 4H), 3.38 (t, 2H, J=6.8 Hz), 2.73 (s, 3H), 1.50~1.46 (m, 18H)

$^1$H NMR (400 MHz, DMSO-d$_6$) δ 10.90 (s, 1H), 10.14 (s, 1H), 8.77 (t, 1H, J=5.6 Hz), 8.30 (d, 1H, J=2.4 Hz), 8.24 (dd, 1H, J=2.4 Hz, 8.8 Hz), 7.44 (d, 1H, J=9.2 Hz), 4.67 (t, 2H, J=4.4 Hz), 3.70~3.60 (m, 6H), 3.30~3.15 (m, 6H), 2.68 (s, 3H), 1.40~1.40 (m, 18H)

Example 24: Preparation of N-(2-(diethylamino)ethyl)-2-(4-(2-diethylamino)ethoxy-3-cyanophenyl)-4-methylthiazole-5-carboxamide hydrochloride

The titled compound was prepared in accordance with the same procedures as in Example 23, except for using N-(2-(diethylamino)ethyl)-2-(3-cyano-4-hydroxyphenyl)-4-methylthiazole-5-carboxamide hydrochloride prepared in Example 19. (Yield: 46.3%)

TLC R$_f$=0.30 in 20% MeOH in Chloroform $^1$H NMR (400 MHz, DMSO-d$_6$) δ 10.54 (s, 1H), 10.31 (s, 1H), 8.65 (t, 1H, J=5.2 Hz), 8.30 (d, 1H, J=2.4 Hz), 8.25 (dd, 1H, J=2.4 Hz, 8.8 Hz), 7.44 (d, 1H, J=8.8 Hz), 4.64 (s, 2H), 3.70~3.60 (m, 4H), 3.40~3.15 (m, 10H), 1.35~1.20 (m, 12H)

Example 25: Preparation of N-(2-(dimethylamino)ethyl)-2-(4-(2-diethylamino)ethoxy-3-cyanophenyl)-4-methylthiazole-5-carboxamide hydrochloride

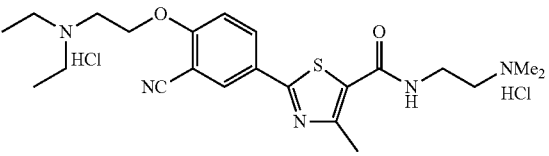 [SMILES: CCN(CC)CCOc1ccc(-c2nc(C)c(C(=O)NCCN(C)C)s2)cc1C#N ; Cl ; Cl]

The titled compound was prepared in accordance with the same procedures as in Example 23, except for using N-(2-(dimethylamino)ethyl)-2-(3-cyano-4-hydroxyphenyl)-4-methylthiazole-5-carboxamide hydrochloride prepared in Example 20. (Yield: 55.5%)

TLC R$_f$=0.25 in 20% MeOH in Chloroform $^1$H NMR (400 MHz, DMSO-d$_6$) δ 10.80 (s, 1H), 10.45 (s, 1H), 8.89 (t, 1H, J=5.2 Hz), 8.30 (d, 1H, J=2.4 Hz), 8.25 (dd, 1H, J=2.4 Hz, 8.8 Hz), 7.44 (d, 1H, J=8.8 Hz), 4.66 (t, 2H, J=4.8 Hz), 3.65~3.55 (m, 4H), 3.30~3.20 (m, 6H), 2.83 (s, 3H), 2.82 (s, 3H), 2.66 (s, 3H), 1.35~1.28 (m, 6H)

Example 26: Preparation of N-(2-(4-morpholino)ethyl)-2-(4-(2-diethylamino)ethoxy-3-cyanophenyl)-4-methylthiazole-5-carboxamide hydrochloride

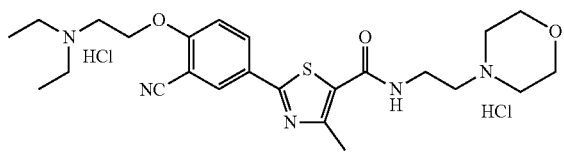 [SMILES: CCN(CC)CCOc1ccc(-c2nc(C)c(C(=O)NCCN3CCOCC3)s2)cc1C#N ; Cl ; Cl]

The titled compound was prepared in accordance with the same procedures as in Example 23, except for using N-(2-(4-morpholino)ethyl)-2-(3-cyano-4-hydroxyphenyl)-4-methylthiazole-5-carboxamide hydrochloride prepared in Example 21. (Yield: 52.1%)

TLC $R_f$=0.40 in 20% MeOH in Chloroform $^1$H NMR (400 MHz, DMSO-$d_6$) δ 11.24 (s, 1H), 10.86 (s, 1H), 8.70 (t, 1H, J=5.6 Hz), 8.30 (d, 1H, J=2.4 Hz), 8.24 (dd, 1H, J=2.4 Hz, 8.8 Hz), 7.44 (d, 1H, J=8.8 Hz), 4.66 (t, 2H, J=4.8 Hz), 4.05~3.95 (m, 2H), 3.90~3.80 (m, 4H), 3.75~3.65 (m, 2H), 3.65~3.60 (m, 2H), 3.60~3.50 (m, 2H), 3.45~3.25 (m, 6H), 3.20~3.10 (m, 2H), 2.66 (s, 3H), 1.30 (t, 6H, J=7.2 Hz)

Example 27: Preparation of N—((S)-2-(1-ethyl)pyrrolidinomethyl)-2-(4-(2-diethylamino)ethoxy-3-cyanophenyl)-4-methylthiazole-5-carboxamide hydrochloride

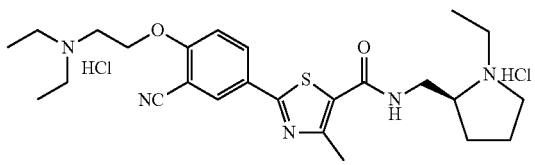 [SMILES: CCN(CC)CCOc1ccc(-c2nc(C)c(C(=O)NC[C@@H]3CCCN3CC)s2)cc1C#N ; Cl ; Cl]

The titled compound was prepared in accordance with the same procedures as in Example 23, except for using N—((S)-2-(1-ethyl)pyrrolidinomethyl)-2-(3-cyano-4-hydroxyphenyl)-4-methylthiazole-5-carboxamide hydrochloride prepared in Example 22. (Yield: 28.8%)

TLC $R_f$=0.08 in 20% MeOH in Chloroform $^1$H NMR (400 MHz, DMSO-$d_6$) δ 10.70 (s, 1H), 10.66 (s, 1H), 8.80 (t, 1H, J=5.6 Hz), 8.31 (d, 1H, J=2.4 Hz), 8.25 (dd, 1H, J=2.4 Hz, 8.8 Hz), 7.45 (d, 1H, J=8.8 Hz), 4.65 (t, 2H, J=4.4 Hz), 3.80~3.50 (m, 6H), 3.45~3.35 (m, 5H), 3.15~3.05 (m, 2H), 2.67 (s, 3H), 2.20~2.10 (m, 1H), 2.05~1.80 (m, 3H), 1.35~1.25 (m, 9H)

Example 28: Preparation of N-((4-(dimethylamino)tetrahydro-2H-pyran-4-yl)methyl)-2-(3-cyano-4-hydroxyphenyl)-4-methylthiazole-5-carboxamide hydrochloride

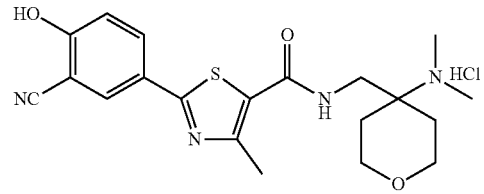 [SMILES: Cc1nc(-c2ccc(O)c(C#N)c2)sc1C(=O)NCC1(N(C)C)CCOCC1 ; Cl]

A mixture of 2-(3-cyano-4-hydroxyphenyl)-4-methylthiazole-5-carboxylic acid (5.00 g), hydroxybenzotriazole (2.86 g), dicyclohexylcarbodiimide (4.36 g) and dimethylformamide (45 ml) was stirred for 10 minutes. N-methylmorpholine (2.14 g) and 4-(aminomethyl)-N,N-dimethyltetrahydro-2H-pyran-4-amine (3.50 g) were added to the mixture, which was heated to 50° C. and then stirred for 4 hours. The reaction mixture was cooled to 0~5° C. and then filtered to discard the resulting solid. The filtrate was concentrated under reduced pressure to obtain N-((4-(dimethylamino)tetrahydro-2H-pyran-4-yl)methyl)-2-(3-cyano-4-hydroxyphenyl)-4-methylthiazole-5-carboxamide. The compound was dissolved in 2N hydrochloric acid solution (25 ml) and purified water (100 ml), washed with ethyl acetate (100 ml), and then filtered. The resulting filtrate was stirred for 1 hour and then filtered. The resulting solid was washed with cold purified water (10 ml) and then acetone (50 ml) was added thereto. The mixture was stirred for 30 minutes and then filtered. The resulting solid was washed with acetone (20 ml) and then dried at 50-55° C. to obtain 7.10 g of the titled compound. (Yield: 84.6%)

TLC $R_f$=0.48 in 20% MeOH in Chloroform $^1$H NMR (400 MHz, DMSO-$d_6$) δ 11.98 (s, 1H), 10.48 (s, 1H), 8.67 (t, 1H, J=6.4 Hz), 8.15 (d, 1H, J=2.4 Hz), 8.06 (dd, 1H, J=6.4 Hz, 8.8 Hz), 7.21 (d, 1H, J=8.8 Hz), 3.92~3.85 (m, 2H), 3.83 (d, 2H, J=6.4 Hz), 3.68~3.58 (m, 2H), 2.79 (s, 6H), 2.63 (s, 3H), 2.00~1.88 (m, 4H)

Example 29: Preparation of N-((4-(dimethylamino)tetrahydro-2H-pyran-4-yl)methyl)-2-(4-(2-diethylamino)ethoxy-3-cyanophenyl)-4-methylthiazole-5-carboxamide hydrochloride

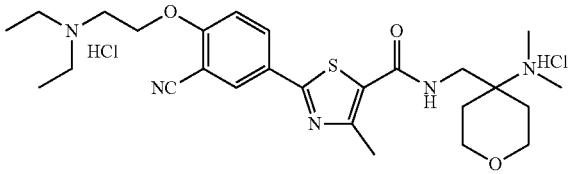 [SMILES: CCN(CC)CCOc1ccc(-c2nc(C)c(C(=O)NCC3(N(C)C)CCOCC3)s2)cc1C#N ; Cl ; Cl]

The titled compound was prepared in accordance with the same procedures as in Example 23, except for using N-((4-(dimethylamino)tetrahydro-2H-pyran-4-yl)methyl)-2-(3-cyano-4-hydroxyphenyl)-4-methylthiazole-5-carboxamide hydrochloride prepared in Example 28. (Yield: 74.0%)

TLC $R_f$=0.38 in 20% MeOH in Chloroform $^1$H NMR (400 MHz, DMSO-$d_6$) δ 10.45~10.35 (m, 2H), 8.72 (t, 1H, J=6.4 Hz), 8.33 (d, 1H, J=2.4 Hz), 8.27 (dd, 1H, J=6.4 Hz, 8.8 Hz), 7.45 (d, 1H, J=8.8 Hz), 4.64 (t, 2H, J=4.4 Hz), 3.98~3.85 (m, 2H), 3.84 (d, 2H, J=6.4 Hz), 3.70~3.60 (m, 4H), 3.35~3.25 (m, 4H), 2.80 (d, 6H, J=4.8 Hz), 2.65 (s, 3H), 1.95~1.88 (m, 4H), 1.30 (t, 6H, J=7.2 Hz)

Test Example 1: Autophagy-Inducing Activities

The autophagy-inducing activities of the compounds of the present invention were measured in Hela cells (Korean Cell Line Bank), using the Autophagy Detection Kit (DAPGreen Autophagy detection (Dojindo, D676-10)), according to the manufacturer's instructions. Specifically, Hela cells ($8 \times 10^4$ cells), along with FluroBrite DMEM containing 10% fetal bovine serum (FBS), were seeded to each well of a 96-well plate and then incubated overnight at 37° C. in a $CO_2$ incubator so as to stabilize the cells. The DAPGreen (Cat. D676-10, Dojindo) solution (0.1 mM in DMSO) was diluted to 1/1000 in a medium (FluroBrite DMEM containing 10% FBS) to prepare a medium containing 0.1 μM DAPGreen (DAPGreen/FBS-containing medium). After the supernatant was removed from each well to which monolayer cells were attached, each well was washed with FluroBrite DMEM. The DAPGreen/FBS-containing medium prepared in the above (100 μl) was added to each well, which was incubated in a $CO_2$ incubator for 30 minutes. Fluorescence values (EX: 450 nm/EM: 535 nm) were measured at the start time and at the time of 30 minutes from the DAPGreen treatment, respectively. The difference value thereof was set to the baseline uptake value of the cells.

Similar to the baseline uptake value measurement, the supernatant was removed from each well to which monolayer cells were attached and then each well was washed with FluroBrite DMEM. The compounds of Examples, the control (2-(3-cyano-4-isobutoxyphenyl)-4-methylthiazole-5-carboxylic acid), and the positive control (rapamycin) were dissolved in DMSO, respectively. Each solution was diluted to the concentrations of 500 nM and 1000 nM in the DAPGreen/FBS-containing medium (100 μl) and then treated thereto. Three wells were tested for each concentration (n=3). After incubating at 37° C. for 4 hours, fluorescence values (EX: 450 nm/EM: 535 nm) were measured. After the baseline uptake value was subtracted from the fluorescence value of each well, each resulting value was normalized based on the mean uptake value of the DMSO treatment group.

The relative fluorescence values according to the treatments of the test materials (1000 nm and 500 nm) and the control (2-(3-cyano-4-isobutoxyphenyl)-4-methylthiazole-5-carboxylic acid: 1000 nm and 500 nm) were calculated based on the fluorescence values according to the treatment of the positive control (rapamycin: 1000 nm and 500 nm). The results thereof are shown in Table 1 below. In Table 1, the relative fluorescence value is 1 when the autophagy-inducing activity of the test material prepared in an Example is equal to that of the positive control. The relative fluorescence value is greater than 1 when the test material prepared in an Example shows higher autophagy-inducing activity than the positive control, while the relative fluorescence value is less than 1 when the test material prepared in an Example shows lower autophagy-inducing activity than the positive control.

TABLE 1

| Test material/concentration | Relative fluorescence value (incubation for 4 hours) | |
| --- | --- | --- |
| | 1000 nM | 500 nM |
| Example 1 | 0.951 | 1.022 |
| Example 2 | 0.929 | 0.902 |
| Example 3 | 0.963 | 0.918 |
| Example 4 | 0.941 | 0.975 |
| Example 5 | 0.713 | 0.766 |
| Example 6 | 0.841 | 1.069 |
| Example 7 | 0.873 | 1.035 |
| Example 8 | 0.813 | 0.965 |
| Example 9 | 0.949 | 0.994 |
| Example 10 | 1.242 | 0.976 |
| Example 11 | 0.921 | 0.991 |
| Example 12 | 1.001 | 0.752 |
| Example 13 | 0.836 | 0.854 |
| Example 14 | 1.079 | 0.925 |
| Example 15 | 0.924 | 0.847 |
| Example 16 | 1.177 | 1.663 |
| Example 17 | 1.046 | 1.674 |
| Example 18 | 0.731 | 0.838 |
| Example 19 | 1.229 | 0.869 |
| Example 20 | 1.240 | 0.758 |
| Example 21 | 0.916 | 2.286 |
| Example 22 | 1.064 | 2.018 |
| Example 23 | 0.878 | 0.958 |
| Example 24 | 1.167 | 0.969 |
| Example 25 | 1.076 | 1.415 |
| Example 26 | 1.343 | 1.718 |
| Example 27 | 1.004 | 1.370 |
| Example 28 | 1.715 | 2.133 |
| Example 29 | 1.306 | 1.896 |
| 2-(3-cyano-4-isobutoxyphenyl)-4-methylthiazole-5-carboxylic acid | 0.590 | 0.697 |
| Rapamycin | 1.000 | 1.000 |

From the results in the above Table 1, it can be seen that, when incubated for 4 hours after the treatment of the test materials, the compounds according to the present invention exhibited autophagy-inducing activities equal to or higher than the positive control (i.e., rapamycin) and exhibits remarkably excellent autophagy-inducing activities than 2-(3-cyano-4-isobutoxyphenyl)-4-methylthiazole-5-carboxylic acid having a carboxylic acid moiety. Therefore, the compounds according to the present invention exhibit an excellent autophagy-inducing activity, thereby being able to be usefully applied for preventing and treating various diseases associated with autophagy, including neurodegenerative diseases, hepatic diseases, metabolic diseases, sepsis, and so on.

Test Example 2: Analysis of Autophagic Vesicle Formation

Autophagy lysosomal pathway (ALP) activation by the compounds of the present invention was verified, through measuring the degree of autophagic vesicle formation in neuron cells with the CYTO-ID™ Autophagy Detection Kit (ENZ-51031-K200, Enzo Life Sciences, Inc.). Neuron cells (i.e., primary mouse cortical neuron cells) were isolated from mice using an enzymatic digest method. Specifically, primary mouse cortical neuron cells were isolated by incubating the cortice tissues derived from 16 day embryonic C57BL6 mice, at 37° C. for 30 minutes, with 20 U/ml papain (Worthington Biochemical Corporation, LK003176) and 0.005% DNase I (Worthington Biochemical Corporation, LK003170).

The primary mouse cortical neuron cells ($8 \times 10^4$ cells) and a medium (a neural cell culture media containing 2 mM L-glutamine (Gibco, 25030-081), N2 supplement (Gibco, 17502-048), B27 supplement (Gibco, 17504-044), and 50

μg/ml penicillin-streptomycin (Gibco, 15140-122)) were added to each well of a 96-well plate and then incubated overnight at 37° C. in a CO₂ incubator. The compound of Example 10 (5 μM), the compound of Example 29 (5 μM), and rapamycin (10 μM) were respectively treated to the cells, which were incubated at 37° C. in a CO₂ incubator for 24 hours. After each well was washed with 1×Assay Buffer (Enzo Life Science, ENZ-51031-K200), 0.2 μl of Cyto-ID autophagy dye and 0.1 μl of Hoechst 33342 were treated to the cells, which were incubated at 37° C. in a CO₂ incubator for 30 minutes. After each well was washed with 1×Assay Buffer (Enzo Life Science, ENZ-51031-K200), the fluorescence values of Cyto-ID (EX: 480 nm, EM: 530 nm) and Hoechst 33342 (EX: 340 nm, EM: 480 nm) were respectively measured with a fluorometer. Three wells were tested for each group. After normalization was carried out through dividing the Cyto-ID fluorescence value of each well by Hoechst 33342 fluorescence value, each relative intensity was calculated by setting that of the untreated control to 1. The results thereof are shown in Table 2 below.

TABLE 2

Cyto-ID fluorescence value (relative intensity)

| Test material | Relative intensity |
|---|---|
| Example 10 (5 μM) | 1.813 |
| Example 29 (5 μM) | 2.171 |
| Rapamycin (10 μM) | 1.668 |

From the results in the above Table 2, it can be seen that the compounds Examples 10 and 29 significantly increase autophagic vesicle formation, even at ½ concentration, compared to the positive control (i.e., rapamycin). Therefore, the compounds according to the present invention exhibit an excellent autophagy-inducing activity, thereby being able to be usefully applied for preventing and treating various diseases associated with autophagy, including neurodegenerative diseases, hepatic diseases, metabolic diseases, sepsis, and so on.

Test Example 3: Analysis of Autophagy Flux

Figure 1B:
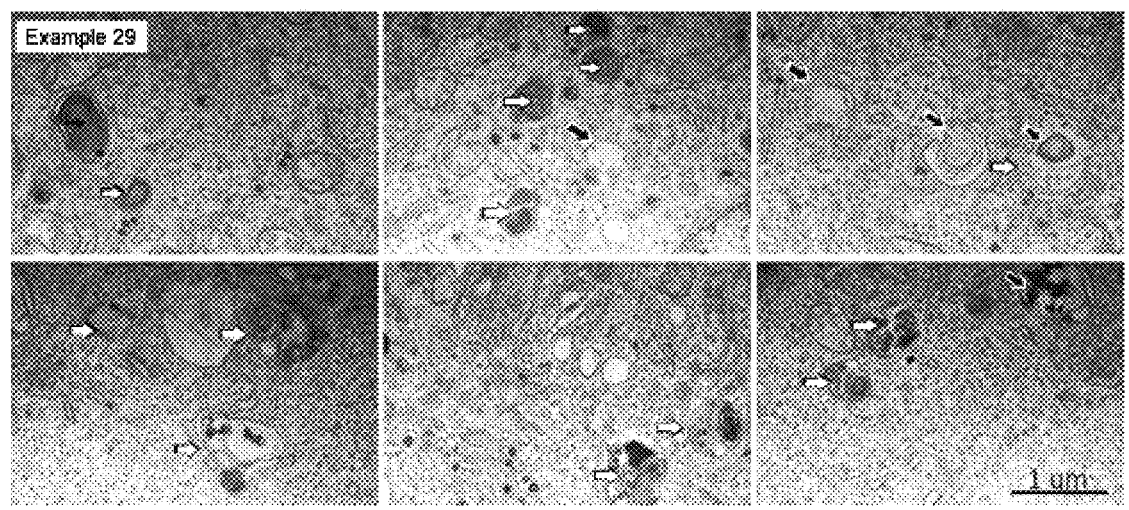
FIG. 1b shows the electron microscope imaging results of the N2a cells treated with the compound of Example 29, where the black arrows indicate autophagosomes and the white arrows indicate autolysosome.

N2a cells (ATCC, CCL-131, mouse neuroblastoma cell line) (3×10⁴ cells) and a medium (DMEM (Dulbecco's modified Eagle's medium, Gibco, 11995-065) supplemented with 5% heat-inactivated fetal bovine serum, FBS; Gibco, 16000-044) and 50 μg/ml penicillin-streptomycin (Gibco, 15140-122) were added to each well of a 6-well plate and incubated overnight at 37° C. in a CO₂ incubator. The compound of Example 29 (5 μM) and rapamycin (10 μM) were respectively treated and then incubated at 37° C. in a CO₂ incubator for 24 hours. Three wells per each group were subject to electron microscope block formation and then pre-fixation, post-fixation, dehydration, substitution, and embedding were carried out according to a flat-embedding method. After ultra-thin sections having a thickness of 70 nm were prepared, heavy metal staining (uranyl acetate, lead citrate) was carried out on the each section, which was photographed through a mosaic imaging technique for imaging the entire cells. The electron microscope imaging results are shown in FIG. 1. In addition, the results obtained by measuring the numbers of the total autophagies (autophagic vesicles), autophagosomes, and autolysosomes per cell according to the treatment groups are shown in Table 3 below. In Table 3 below, the control means the untreated control.

TABLE 3

Numbers of the autophagy per cell

| Test material | Autophagic vesicles | Autophagosome | Autolysosome |
|---|---|---|---|
| Control | 8.3 | 4.6 | 4.7 |
| Example 29 (5 μM) | 22.3 | 6.9 | 14.9 |
| Rapamycin (10 μM) | 13.3 | 4.1 | 7.6 |

From the results in the above Table 3, it can be seen that the compound Example 29 significantly increase autophagic vesicle formation, especially autolysosome formation, even at ½ concentration, compared to the positive control (i.e., rapamycin). Therefore, the compounds according to the present invention exhibit an excellent autophagy-inducing activity, thereby being able to be usefully applied for preventing and treating various diseases associated with autophagy, including neurodegenerative diseases, hepatic diseases, metabolic diseases, sepsis, and so on.

Test Example 4: Evaluation of Liver Function-Improving Activities by Oral Administration in the Liver Injury Model (1)

Figure 2:
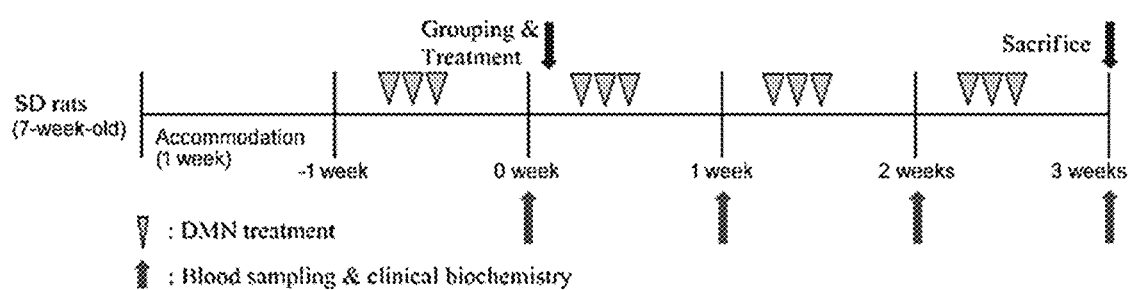
FIG. 2 shows the summarized experimental methods according to Test Example 4, in order to evaluate liver function-improving activities by oral administration in the liver injury model.

The compounds according to the present invention were orally administered to dimethylnitrosamine (DMN)-induced liver injury male SD rats for 3 weeks, so as to evaluate liver function-improving activities. Specifically, 7-week-old male SD rats (Orient Bio, Korea) were accommodated to the laboratory environment at room temperature for 7 days. General symptoms were observed and then only healthy animals were used for the experiment. The rats were divided into 4 groups (n=5 for each group), i.e., the normal control group, the group to which only DMN is administered, and the groups to which both the compound of the present invention (the compound of Example 2 or 23) and DMN are administered. DMN was dissolved in purified water and then administered intraperitoneally at the dose of 10 mg/kg for 3 consecutive days per week (3 times per week, for 4 weeks). Blood samples were collected on Day 3 after the completion of the first-week liver injury inducement and then the serum ALT (Alanine Transaminase) values and the serum AST (Aspartate Transaminase) values were measured so as to confirm the liver injury thereof. The compounds of the present invention were administered for 3 weeks, i.e., from Day 4 after the completion of the first-week liver injury inducement to the DMN-administering period. The compounds of the present invention were dissolved in purified water and then orally administered, using an oral zonde, at the dose of 25 mg/kg once a day for 3 weeks. Blood samples were collected on Day 0 (3 days after the completion of the first-week liver injury inducement) and Day 7, 14 and 21 after the administration of the test materials. The collected blood was injected into a vacutainer tube containing a clot activator and then allowed to stand at room temperature for about 20 minutes so as to coagulate each blood sample. After centrifugation for 10 minutes, the resulting serums were subjected to blood-biochemical tests. The experimental methods are summarized in FIG. 2. The results obtained from the measurements were subject to group comparison, through parametric multiple comparisons or non-parametric multiple comparisons, with SPSS. When P<0.05, it was determined to be statistically significant.

The serum ALT and AST values obtained by performing the blood-biochemical tests as described above are shown in Tables 4 and 5 below.

TABLE 4

| Group | ALT values (unit: U/L, average value) | | | |
| --- | --- | --- | --- | --- |
|  | 0 week | 1 week | 2 weeks | 3 weeks |
| Normal control group | 45.64 | 54.04 | 53.68 | 55.00 |
| DMN-administered group | 72.58 | 107.52 | 124.82 | 156.26 |
| The compound of Example 2 and DMN-administered group | 70.76 | 93.68 | 107.06 | 117.02 |
| The compound of Example 23 and DMN-administered group | 67.64 | 94.40 | 97.64 | 101.04 |

TABLE 5

| Group | AST values (unit: U/L, average value) | | | |
| --- | --- | --- | --- | --- |
|  | 0 week | 1 week | 2 weeks | 3 weeks |
| Normal control group | 109.64 | 142.88 | 137.60 | 142.74 |
| DMN-administered group | 140.16 | 207.10 | 250.84 | 301.04 |
| The compound of Example 2 and DMN-administered group | 138.50 | 180.72 | 218.90 | 231.54 |
| The compound of Example 23 and DMN-administered group | 145.10 | 208.56 | 221.58 | 203.44 |

As can be seen from the results of Tables 4 and 5, the serum ALT and AST values in the DMN-administered group were respectively increased about 3 times and about 2 times, after 3 weeks. However, in the groups administered with both the compound of the present invention and DMN, the ALT values at the 3 weeks after the administration were 101.04 and 117.02 (i.e., decreased by 35% and 25% in comparison with that of the DMN-administered group); and the AST values at the 3 weeks after the administration were 203.44 and 231.54 (i.e., decreased by 32% and 23% in comparison with that of the DMN-administered group). Therefore, it can be confirmed that the compounds of the present invention have excellent inhibitory activity against liver fibrosis.

Test Example 5: Evaluation of Liver Function-Improving Activities by Oral Administration in the Liver Injury Model (2)

Figure 3:
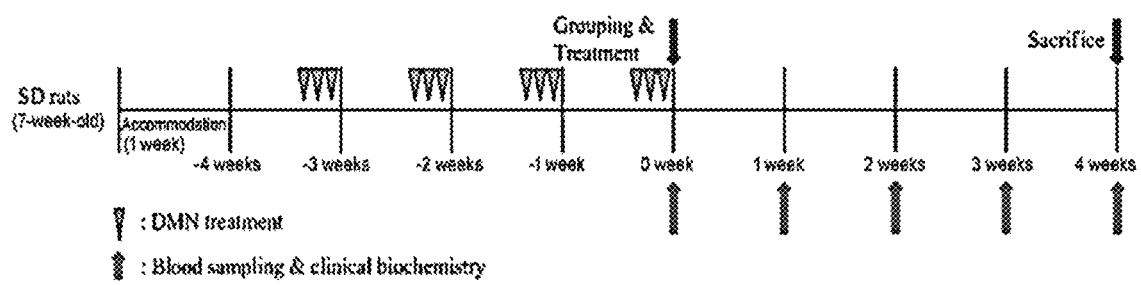
FIG. 3 shows the summarized experimental methods according to Test Example 5, in order to evaluate liver function-improving activities by oral administration in the liver injury model.

The compounds according to the present invention were orally administered to dimethylnitrosamine (DMN)-induced liver injury male SD rats for 4 weeks, so as to evaluate liver function-improving activities. Specifically, 7-week-old male SD rats (Orient Bio, Korea) were accommodated to the laboratory environment at room temperature for 7 days. General symptoms were observed and then only healthy animals were used for the experiment. The rats were divided into 5 groups (n=10 for each group), i.e., the normal control group, the group to which only DMN is administered, and the group to which both the compound of the present invention (the compound of Example 23, 26, or 29) and DMN are administered. DMN was dissolved in purified water and then administered intraperitoneally at the dose of 10 mg/kg for 3 consecutive days per week (3 times per week, for 4 weeks). Blood samples were collected after the completion of the fourth-week liver injury inducement and then the serum ALT (Alanine Transaminase) values and the serum AST (Aspartate Transaminase) values were measured so as to confirm the liver injury thereof. The compounds of the present invention were administered for 4 weeks, from Day 1 after the completion of the fourth-week liver injury inducement. The compounds of the present invention were dissolved in purified water and then orally administered, using an oral zonde, at the dose of 25 mg/kg once a day for 4 weeks. Blood samples were collected on Day 0 (1 day after the completion of the fourth-week liver injury inducement) and Day 7, 14, 21 and 28 after the administration of the test materials. The collected blood was injected into a vacutainer tube containing a clot activator and then allowed to stand at room temperature for about 20 minutes so as to coagulate each blood sample. After centrifugation for 10 minutes, the resulting serums were subjected to blood-biochemical tests. In addition, at 24 hours after the last administration, an autopsy for hepatectomy and fixation was performed to prepare the tissue specimens thereof. After preparing the slides with the tissue specimens, hematoxylin and eosin (H&E) staining was performed thereon for microscopic observation of damages to liver tissue and inflammatory cell infiltrations in liver tissues. In addition, Masson's trichrome staining was also performed thereon for microscopic observation of collagen fiber depositions in liver tissues. The experimental methods are summarized in FIG. 3. The results obtained from the measurements were subject to group comparison, through parametric multiple comparisons or non-parametric multiple comparisons, with SPSS. When $P<0.05$, it was determined to be statistically significant. The serum ALT and AST values obtained by performing the blood-biochemical tests as described above are shown in Tables 6 and 7 below.

TABLE 6

| Group | ALT values (unit: U/L, average value) | | | | |
| --- | --- | --- | --- | --- | --- |
|  | 0 week | 1 week | 2 weeks | 3 weeks | 4 weeks |
| Normal control group | 50.90 | 51.15 | 50.09 | 48.38 | 48.79 |
| DMN-administered group | 254.33 | 111.02 | 64.26 | 63.65 | 65.60 |
| The compound of Example 23 and DMN-administered group | 198.30 | 104.22 | 65.66 | 60.95 | 52.93 |
| The compound of Example 26 and DMN-administered group | 199.51 | 134.97 | 70.09 | 62.81 | 59.12 |
| The compound of Example 29 and DMN-administered group | 219.29 | 99.31 | 66.57 | 53.03 | 52.97 |

TABLE 7

| Group | AST values (unit: U/L, average value) | | | | |
| --- | --- | --- | --- | --- | --- |
|  | 0 week | 1 week | 2 weeks | 3 weeks | 4 weeks |
| Normal control group | 103.83 | 99.78 | 93.96 | 117.32 | 117.91 |
| DMN-administered group | 339.76 | 182.01 | 132.13 | 143.45 | 158.68 |
| The compound of Example 23 and DMN-administered group | 395.34 | 169.11 | 140.57 | 128.30 | 125.15 |
| The compound of Example 26 and DMN-administered group | 322.72 | 153.48 | 145.71 | 138.76 | 114.45 |
| The compound of Example 29 and DMN-administered group | 376.67 | 164.60 | 143.87 | 127.65 | 123.33 |

Figure 4:
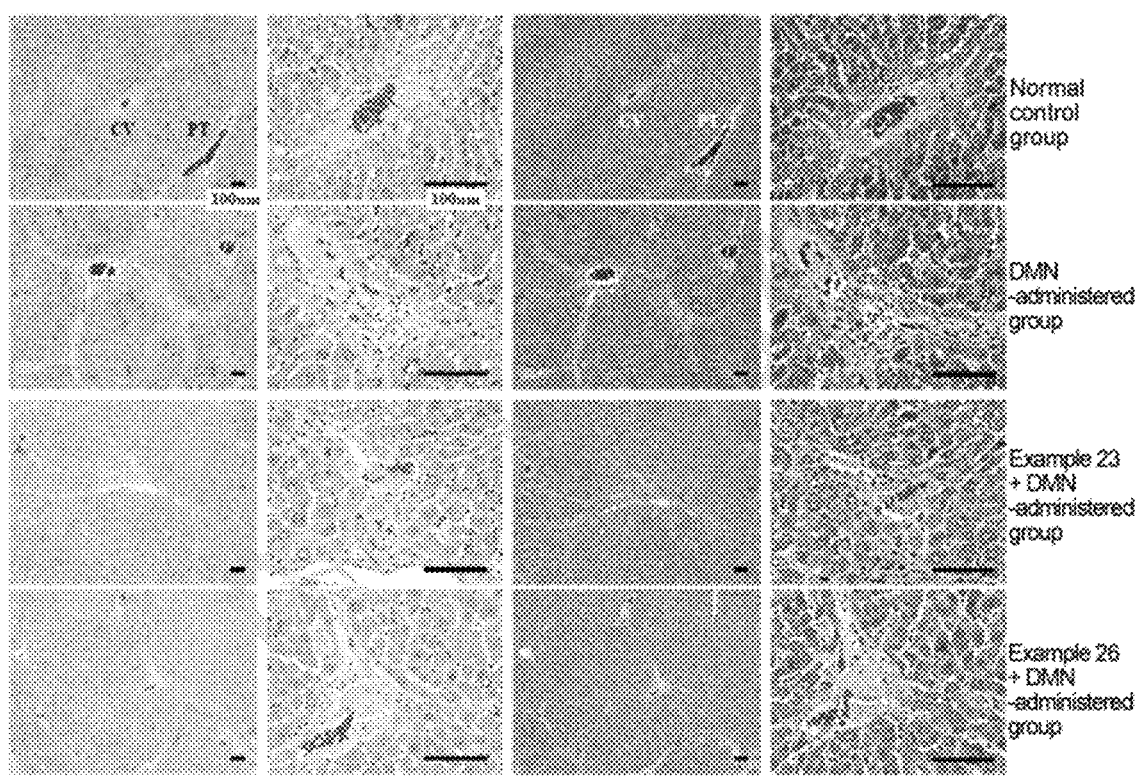
FIG. 4 show the results obtained by performing hematoxylin and eosin (H&E) staining and Masson's trichrome staining on the tissue specimens obtained in Test Example 5. Scale bar: left black line 100 μm, right black line 100 μm.

As can be seen from the results of Tables 6 and 7, the serum ALT and AST values in the DMN-administered group were respectively increased about 4-5 times and about 3-4 times, after 4 weeks. However, in the groups administered with both the compound of the present invention and DMN, the ALT values at the 4 weeks after the administration were 52.93~59.12 (i.e., decreased by 9.9~19% in comparison with that of the DMN-administered group); and the AST values at the 4 weeks after the administration were 114.45~125.59 (i.e., decreased by 21~28% in comparison with that of the DMN-administered group). Especially, the group treated with the compound of Example 26 showed the AST value equivalent to that of the normal control group, at the 4 weeks after the administration. Therefore, it can be confirmed that the compounds of the present invention have excellent treating activity against liver fibrosis. In addition, the results obtained by preparing the liver tissue specimens through autopsy of the normal control group, the DMN-administered group (for 4 weeks), and the compound of present invention (the compound of Example 23 or 26) and DMN-administered groups and then performing the hematoxylin and eosin (H&E) staining and the Masson's trichrome staining as described above are shown in FIG. 4. From the results of FIG. 4, the degrees of damage to liver tissue and inflammatory cell infiltration in liver tissues were measured. And also, from the results of FIG. 4, the degree of collagen fiber deposition in liver tissues was measured. The results thereof are shown in Table 8 below.

TABLE 8

| Group | Degenerative hepatocyte numbers cells/1000 cells | Inflammatory cell numbers cells/mm$^2$ | Collagen fiber occupied regions %/mm$^2$ |
|---|---|---|---|
| Normal control group | 33.14 ± 3.23 | 40.29 ± 6.71 | 2.37 ± 0.37 |
| DMN-administered group | 559.88 ± 44.30 | 188.50 ± 9.90 | 28.68 ± 1.83 |
| The compound of Example 23 and DMN-administered group | 319.14 ± 44.66 | 101.43 ± 16.53 | 12.44 ± 2.03 |
| The compound of Example 26 and DMN-administered group | 259.14 ± 42.56 | 90.00 ± 20.67 | 10.75 ± 2.17 |

As can be seen from the results of H&E staining (FIG. 4) an Table 8, the damage to liver tissue and the inflammatory cell infiltration in liver tissues in the DMN-administered group were respectively increased about 17 times and about 5 times, after 4 weeks, in comparison with those of the normal control group. However, in the group administered with both the compound of the present invention (the compound of Example 23 or 26) and DMN, the damages to liver tissue and the inflammatory cell infiltrations in liver tissues were 259.14~319.14 cells/1000 cells and 90.00~101.43 cells/mm$^2$, respectively (i.e., ameliorated by about 43~54% and 46~52%, in comparison with that of the DMN-administered group). And also, as can be seen from the results of Masson's trichrome staining (FIG. 4) and Table 8, the collagen fiber deposition in liver tissues in the DMN-administered group was increased about 12 times, after 4 weeks, in comparison with that of the normal control group. However, in the group administered with both the compound of the present invention (the compound of Example 23 or 26) and DMN, the collagen fiber deposition in liver tissues was 10.75~12.44%/mm$^2$ (i.e., reduced by about 57~63% in comparison with that of the DMN-administered group). Therefore, it can be confirmed that the compounds of the present invention (the compounds of Examples 23 and 26) have excellent inhibitory activity against liver fibrosis.

Test Example 6: Analysis of Inhibitory Activity Against Neuronal Apoptosis by Beta Amyloid The inhibitory activities of the compounds of the present invention against neuronal apoptosis by beta amyloid, known as the major cytotoxic substance in neurodegenerative diseases, were analyzed in N2a cells (ATCC, CCL-131, mouse neuroblastoma cell line) and neuron cells (primary mouse cortical neuron cells) isolated in the same manners as in Test Example 2. The media used in Test Example 3 and Test Example 2 were used as a medium for the N2a cells and as a medium for the neuron cells, respectively. Specifically, N2a cells ($3\times10^4$ cells) and neuron cells ($8\times10^4$ cells), along with the respective media, were added to each well of a 96-well plate and then incubated overnight at 37° C. in a $CO_2$ incubator. The cells were treated with the compound of Example 10 and the compound of Example 29 at the concentrations of 5 μM and 500 nM, respectively, treated with 20 μM of beta amyloid after 30 minutes therefrom, and then incubated at 37° C. in a $CO_2$ incubator for 72 hours. The cells were treated with 10 μL of CCK-8 reagent (Enzo Life Science, ALX-850-039-KI02) and then incubated at 37° C. in a $CO_2$ incubator for 2 hours. Three wells were tested for each group and each absorbance was measured at 450 nm. The absorbance value of the untreated control group was set to 100% cell viability. The cell viability of each group was calculated from the respective absorbance values. The results are shown in Table 9 below. In Table 9, the control group shows a group treated with only 20 μM of beta amyloid.

TABLE 9

| Test material | Cell viability (%) (N2a cells) |
|---|---|
| Control group | 44.68 |
| Example 10 (5 μM) | 68.86 |
| Example 29 (5 μM) | 68.45 |

| Test material | Cell viability (%) (Neuron cells) |
|---|---|
| Control group | 45.10 |
| Example 10 (500 nM) | 52.16 |
| Example 29 (500 nM) | 53.33 |

From the results of Table 9, it can be confirmed that both the compound of Example 10 and the compound of Example 29 significantly inhibit the cytotoxicity caused by beta amyloid treatment. Therefore, the compound according to the present invention can be usefully applied for preventing and treating various neurodegenerative diseases associated with beta amyloid.

Test Example 7: Analysis of Inhibitory Activities Against Mitochondrial Damage by Rotenone The inhibitory activities of the compounds of the present invention against mitochondrial damage by rotenone, known as the major cytotoxic substance in neurodegenerative diseases, were analyzed in N2a cells (ATCC, CCL-131, mouse neuroblastoma cell line). Specifically, N2a cells ($3\times10^4$ cells) and a medium (DMEM (Dulbecco's modified Eagle's medium, Gibco, 11995-065) supplemented with 5% heat-inactivated fetal bovine serum (FBS; Gibco, 16000-044) and 50 μg/ml penicillin-streptomycin (Gibco, 15140-122) were added to each well of a XF24-well culture plate and then incubated overnight at 37° C. in a $CO_2$ incubator. The cells were treated with the compound of Example 10 (5 μM), treated with 10 μM of rotenone after 30 minutes therefrom, and then incubated at 37° C. in a $CO_2$ incubator for 24 hours. After the treatment with a XF Cell Mito Stress Test Kit (Seahorse Bioscience, 103015-100) according to the manufacturer's instructions, the level of mitochondrial respiration was measured, using an XF24 Extracellular Flux Analyzer (Seahorse Bioscience). Four wells were tested for each group; and the basal respiration, the ATP production, the maximal respiration, and the spare respiratory capacity were measured. The levels of each mitochondrial respiration were normalized by the protein quantification value. The basal respiration of the untreated control group was set to 100% and the remaining values are shown. The results are shown in Table 10 below. In Table 10, the control group represents a group treated with only 10 μM of rotenone.

TABLE 10

| Test material | Mitochondrial respiration (%) | | | |
|---|---|---|---|---|
|  | Basal | ATP production | Maximal | Spare |
| Control | 100 | 65.32 | 112.21 | 19.59 |
| Rotenone | 34.76 | 20.33 | 47.67 | 17.00 |
| Example 10 + Rotenone | 51.69 | 31.65 | 62.28 | 16.33 |

From the results of Table 10, it can be confirmed that the compound of Example 10 recovers the mitochondrial damage by rotenone treatment in a statistically significant level. Therefore, the compound according to the present invention can be usefully applied for preventing and treating various neurodegenerative diseases associated with mitochondrial damage.

The invention claimed is:

1. A compound of Formula 1 or a pharmaceutically acceptable salt thereof:

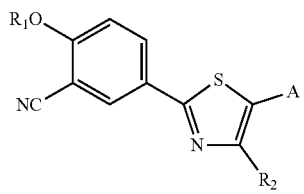

<Formula 1> wherein:
$R_1$ is hydrogen; a $C_1$-$C_4$ alkyl group; or a $C_1$-$C_4$ alkyl group substituted with a mono- or di-$C_1$-$C_5$ alkylamino,
$R_2$ is a $C_1$-$C_4$ alkyl group,
A is selected from the group consisting of Formulas 1a to 1d:

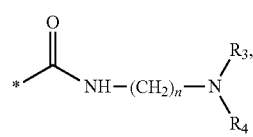

<Formula 1a>

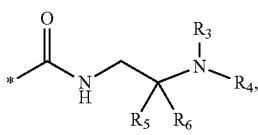

<Formula 1b>

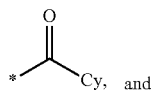

<Formula 1c>

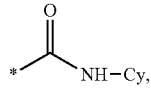

<Formula 1d> wherein * represents the position attached to the compound of Formula 1,
n is 1, 2, or 3,
$R_3$ and $R_4$, independently of each other, are hydrogen or $C_1$-$C_4$ alkyl; or $R_3$ and $R_4$ are joined together with the nitrogen atom to which they are attached, to form piperidine or pyrrolidine, wherein the piperidine or pyrrolidine is optionally substituted with $C_1$-$C_4$ alkyl,
$R_5$ and $R_6$ are $C_1$-$C_4$ alkyl; or $R_5$ and $R_6$ together form a cyclopentane, cyclohexane or tetrahydropyran ring, and
Cy is a nitrogen-containing heterocyclic group selected from the group consisting of homopiperazinyl, piperidinyl, and pyrrolidinyl, wherein the nitrogen-containing heterocyclic group is optionally substituted with $C_1$-$C_4$ alkyl or benzyl.

2. The compound or a pharmaceutically acceptable salt thereof of claim 1, wherein $R_1$ is hydrogen; an isobutyl group; or a diethylaminoethyl group.

3. The compound or a pharmaceutically acceptable salt thereof of claim 1, wherein $R_2$ is a methyl group.

4. The compound or a pharmaceutically acceptable salt thereof of claim 1, wherein A is Formula 1a or Formula 1b.

5. The compound or a pharmaceutically acceptable salt thereof of claim 4, wherein $R_3$ and $R_4$ are joined together with the nitrogen atom to which they are attached, to form piperidine or pyrrolidine, and wherein the piperidine or pyrrolidine is optionally substituted with $C_1$-$C_4$ alkyl.

6. A compound or a pharmaceutically acceptable salt thereof selected from the group consisting of:
N-(2-(diethylamino)ethyl)-2-(3-cyano-4-isobutoxyphenyl)-4-methylthiazole-5-carboxamide hydrochloride;
N-(2-(diisopropylamino)ethyl)-2-(3-cyano-4-isobutoxyphenyl)-4-methylthiazole-5-carboxamide hydrochloride;
N-(2-(dimethylamino)ethyl)-2-(3-cyano-4-isobutoxyphenyl)-4-methylthiazole-5-carboxamide hydrochloride;
N-(3-(diethylamino) propyl)-2-(3-cyano-4-isobutoxyphenyl)-4-methylthiazole-5-carboxamide hydrochloride;
N-(4-methylhomopiperazino)-2-(3-cyano-4-isobutoxyphenyl)-4-methylthiazole-5-carboxamide hydrochloride;
N-(4-(1-methyl) piperidinyl)-2-(3-cyano-4-isobutoxyphenyl)-4-methylthiazole-5-carboxamide hydrochloride;
N-(2-(4-morpholino)ethyl)-2-(3-cyano-4-isobutoxyphenyl)-4-methylthiazole-5-carboxamide hydrochloride;
N-(2-(1-pyrrolidino)ethyl)-2-(3-cyano-4-isobutoxyphenyl)-4-methylthiazole-5-carboxamide hydrochloride;
N-(2-(1-piperidino)ethyl)-2-(3-cyano-4-isobutoxyphenyl)-4-methylthiazole-5-carboxamide hydrochloride;
N-((4-(dimethylamino)tetrahydro-2H-pyran-4-yl) methyl)-2-(3-cyano-4-isobutoxyphenyl)-4-methylthiazole-5-carboxamide hydrochloride;

N-((1-(dimethylamino)cyclopentyl)methyl)-2-(3-cyano-4-isobutoxyphenyl)-4-methylthiazole-5-carboxamide hydrochloride;

N-((1-(dimethylamino)cyclohexyl)methyl)-2-(3-cyano-4-isobutoxyphenyl)-4-methylthiazole-5-carboxamide hydrochloride;

N-(3-(1-benzyl) pyrrolidinyl)-2-(3-cyano-4-isobutoxyphenyl)-4-methylthiazole-5-carboxamide hydrochloride;

N-(2-(2-(1-methyl) pyrrolidino)ethyl)-2-(3-cyano-4-isobutoxyphenyl)-4-methylthiazole-5-carboxamide hydrochloride;

N—((S)-2-(1-ethyl) pyrrolidinomethyl)-2-(3-cyano-4-isobutoxyphenyl)-4-methylthiazole-5-carboxamide hydrochloride;

N-(4-morpholinamino)-2-(3-cyano-4-isobutoxyphenyl)-4-methylthiazole-5-carboxamide hydrochloride;

N-(1-piperidinamino)-2-(3-cyano-4-isobutoxyphenyl)-4-methylthiazole-5-carboxamide hydrochloride;

N-(2-(diisopropylamino)ethyl)-2-(3-cyano-4-hydroxyphenyl)-4-methylthiazole-5-carboxamide hydrochloride;

N-(2-(diethylamino)ethyl)-2-(3-cyano-4-hydroxyphenyl)-4-methylthiazole-5-carboxamide hydrochloride;

N-(2-(dimethylamino)ethyl)-2-(3-cyano-4-hydroxyphenyl)-4-methylthiazole-5-carboxamide hydrochloride;

N-(2-(4-morpholino)ethyl)-2-(3-cyano-4-hydroxyphenyl)-4-methylthiazole-5-carboxamide hydrochloride;

N—((S)-2-(1-ethyl) pyrrolidinomethyl)-2-(3-cyano-4-hydroxyphenyl)-4-methylthiazole-5-carboxamide hydrochloride;

N-(2-(diisopropylamino)ethyl)-2-(4-(2-diethylamino) ethoxy-3-cyanophenyl)-4-methylthiazole-5-carboxamide hydrochloride;

N-(2-(diethylamino)ethyl)-2-(4-(2-diethylamino) ethoxy-3-cyanophenyl)-4-methylthiazole-5-carboxamide hydrochloride;

N-(2-(dimethylamino)ethyl)-2-(4-(2-diethylamino) ethoxy-3-cyanophenyl)-4-methylthiazole-5-carboxamide hydrochloride;

N-(2-(4-morpholino)ethyl)-2-(4-(2-diethylamino) ethoxy-3-cyanophenyl)-4-methylthiazole-5-carboxamide hydrochloride;

N—((S)-2-(1-ethyl) pyrrolidinomethyl)-2-(4-(2-diethylamino) ethoxy-3-cyanophenyl)-4-methylthiazole-5-carboxamide hydrochloride;

N-((4-(dimethylamino)tetrahydro-2H-pyran-4-yl)methyl)-2-(3-cyano-4-hydroxyphenyl)-4-methylthiazole-5-carboxamide hydrochloride; and N-((4-(dimethylamino)tetrahydro-2H-pyran-4-yl)methyl)-2-(4-(2-diethylamino) ethoxy-3-cyanophenyl)-4-methylthiazole-5-carboxamide hydrochloride.

7. A compound or a pharmaceutically acceptable salt thereof selected from the group consisting of:

N-(2-(diisopropylamino)ethyl)-2-(3-cyano-4-isobutoxyphenyl)-4-methylthiazole-5-carboxamide hydrochloride;

N-((4-(dimethylamino)tetrahydro-2H-pyran-4-yl)methyl)-2-(3-cyano-4-isobutoxyphenyl)-4-methylthiazole-5-carboxamide hydrochloride;

N-(2-(diisopropylamino)ethyl)-2-(4-(2-diethylamino) ethoxy-3-cyanophenyl)-4-methylthiazole-5-carboxamide hydrochloride;

N-(2-(4-morpholino)ethyl)-2-(4-(2-diethylamino) ethoxy-3-cyanophenyl)-4-methylthiazole-5-carboxamide hydrochloride;

N-((4-(dimethylamino)tetrahydro-2H-pyran-4-yl)methyl)-2-(3-cyano-4-hydroxyphenyl)-4-methylthiazole-5-carboxamide hydrochloride; and N-((4-(dimethylamino)tetrahydro-2H-pyran-4-yl)methyl)-2-(4-(2-diethylamino) ethoxy-3-cyanophenyl)-4-methylthiazole-5-carboxamide hydrochloride.

8. A process for preparing a compound of Formula 1 or a pharmaceutically acceptable salt thereof, the process comprising acylating a compound of Formula 2 with a N-containing compound selected from the group consisting of $NH_2—(CH_2)_n—NR_3R_4$, $NH_2—CH_2—CR_5R_6—NR_3R_4$, Cy, and $NH_2—Cy$, wherein n, $R_3$, $R_4$, $R_5$, and $R_6$ are the same as defined in claim 1; Cy is a nitrogen-containing heterocycle selected from the group consisting of homopiperazine, piperidine, morpholine, and pyrrolidine, wherein the nitrogen-containing heterocycle is optionally substituted with $C_1$-$C_4$ alkyl or benzyl; and $NH_2$-Cy is a nitrogen-containing heterocyclic amine selected from the group consisting of homopiperazinylamine, piperidinylamine, and pyrrolidinylamine, and wherein the nitrogen-containing heterocyclic amine is optionally substituted with $C_1$-$C_4$ alkyl or benzyl:

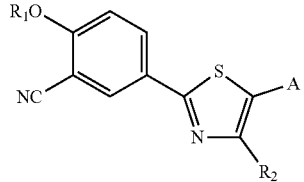

<Formula 1>

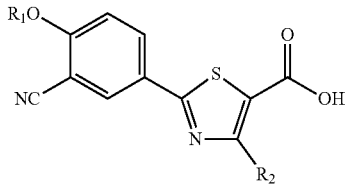

<Formula 2> wherein, $R_1$, $R_2$, and A are the same as defined in claim 1.

9. A process for preparing a compound of Formula 1 or a pharmaceutically acceptable salt thereof, the process comprising acylating a compound of Formula 3 with a N-containing compound selected from the group consisting of $NH_2—(CH_2)_n—NR_3R_4$, $NH_2—CH_2—CR_5R_6—NR_3R_4$, Cy, and $NH_2—Cy$ to prepare a compound of Formula 4, wherein n, $R_3$, $R_4$, $R_5$, and $R_6$ are the same as defined in claim 1; Cy is a nitrogen-containing heterocycle selected from the group consisting of homopiperazine, piperidine, and pyrrolidine, wherein the nitrogen-containing heterocycle is optionally substituted with $C_1$-$C_4$ alkyl or benzyl; and $NH_2—Cy$ is a nitrogen-containing heterocyclic amine selected from the group consisting of homopiperazinylamine, piperidinylamine, and pyrrolidinylamine, and wherein the nitrogen-containing heterocyclic amine is optionally substituted with $C_1$~$C_4$ alkyl or benzyl; and alkylating the compound of Formula 4 with a compound of Formula 5 to prepare a compound of Formula 1:

<Formula 1>

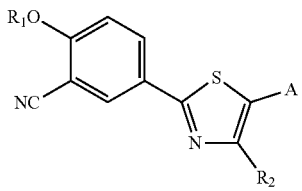

<Formula 3>

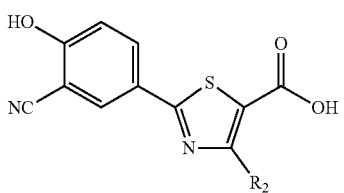

<Formula 4>

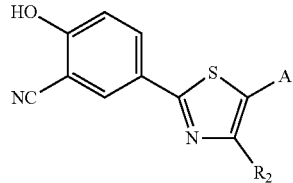

<Formula 5>

R₁X wherein, R₁, R₂, and A are the same as defined in claim 1, and X is halogen.

10. A pharmaceutical composition for inducing autophagy, comprising the compound or a pharmaceutically acceptable salt thereof according to claim 1 as an active ingredient.

11. The pharmaceutical composition of claim 10 for treating neurodegenerative diseases selected from the group consisting of Huntington's disease, Parkinson's disease, Alzheimer's disease, prion disease, multiple sclerosis, and Lou Gehrig's disease; hepatic diseases selected from the group consisting of liver fibrosis, liver cirrhosis, hepatitis, and fatty liver disease; metabolic diseases selected from the group consisting of diabetes, hyperlipidemia, obesity, and inflammation; or sepsis.

* * * * *